United States Patent [19]
Marchand et al.

[11] Patent Number: 5,285,438
[45] Date of Patent: Feb. 8, 1994

[54] MOTIONLESS PARALLEL READOUT HEAD FOR AN OPTICAL DISK RECORDED WITH ARRAYED ONE-DIMENSIONAL HOLOGRAMS

[75] Inventors: Philippe J. Marchand, San Clemente; Ashok V. Krishnamoorthy, San Diego, both of Calif.; Pierre Ambs, Tolouse, France; Kristopher Urquhart, San Diego, Calif.; Sadik C. Esener, Solana Beach, Calif.; H. Sing Lee, Del Mar, Calif.

[73] Assignee: Regents of the University of California, Alameda, Calif.

[21] Appl. No.: 785,742

[22] Filed: Oct. 31, 1991

[51] Int. Cl.[5] ............................................. G11B 7/00
[52] U.S. Cl. ............................... 369/103; 369/275.3; 358/342; 359/29; 359/559
[58] Field of Search ............... 369/103, 44.23, 275.1, 369/275.3; 359/18, 15, 29, 559, 66, 563, 564; 358/342; 365/216

[56] References Cited

U.S. PATENT DOCUMENTS

| | | | |
|---|---|---|---|
| 3,770,886 | 11/1973 | Kiemle | 369/111 |
| 3,895,341 | 7/1975 | Pekau | 359/29 |
| 3,976,354 | 8/1976 | Braitberg et al. | 359/29 |
| 4,012,108 | 3/1977 | Ishii et al. | 369/103 |
| 4,295,162 | 10/1981 | Carlsen | 369/103 |
| 4,420,829 | 12/1983 | Carlson | 369/103 |
| 5,111,445 | 5/1992 | Psaltis et al. | 369/103 |

*Primary Examiner*—Constantine Hannaher
*Assistant Examiner*—Jim Beyer
*Attorney, Agent, or Firm*—Fuess, Davidenas & Meadows

[57] ABSTRACT

A motionless parallel head reads an optical disk having an active surface encoded with an arrayed multiplicity of one-dimensional holograms. Each 1-D hologram is a computer-encoded representation of, typically, one 128 pixel slice of an image. A group, typically 128, 1-D holograms are positionally distributed, and positionally shifted or staggered one to the next, radially along the disk's active surface so as to fit a complete radius. Typically 14,000 groups are circumferentially-displaced around a 5¼" Compact Disk (CD), forming a herringbone pattern. During readout the encoded CD is simultaneously illuminated along the entirety of one of its radius lines within which a group of holographic data blocks are fitted. The illuminated group of holographic data blocks are optically transformed in parallel by one or more lenses, and preferably by a Hybrid refractive/diffractive Optical Lens (HOL), so as to two-dimensionally spatially encode the wavefront of the light beam by which the group of holographic data blocks was illuminated. The 2-D spatially-encoded light beam is detectable by an array of light detectors. When the disk is rotated then sucessive groups of holographic data blocks that are fitted along successive radius lines are successively retrieved, group by group, at a typically 1.1 Gbyte/sec rate. Such an optical memory is useable as the secondary storage of a high performance optoelectronic associative memory system.

50 Claims, 24 Drawing Sheets

|  | Diffraction effiency | Worst case contrast ratio | Average contrast ratio |
|---|---|---|---|
| Cell Oriented | 7 % | < 1 | 10 |
| Error Diffusion | 5 % | 2 | 15 |
| FFT Grey level 4x1 | 5 % | 5 | 25 |
| Iterative Grey level 4x1 | 12 % | 50 | 350 |

Figure 7

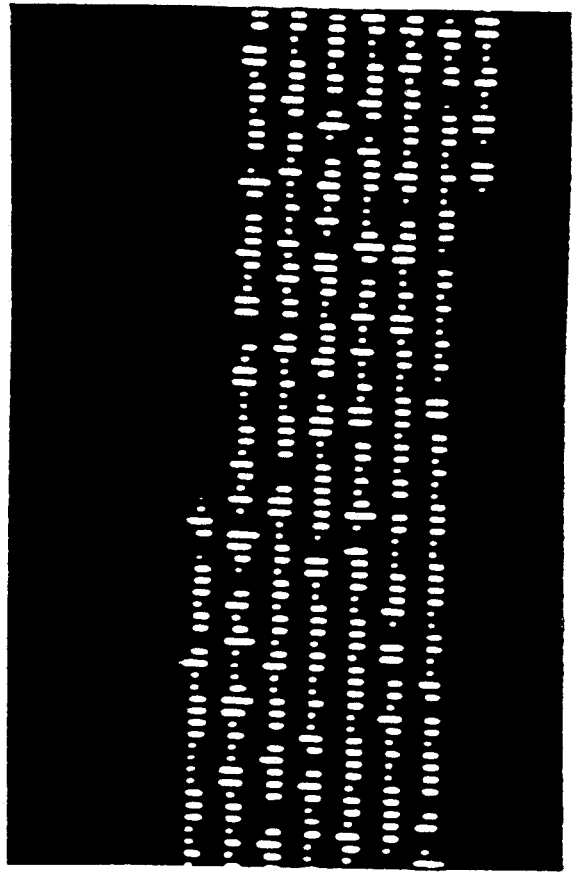 
Radial Direction
Figure 8

Bit sequence to be detected 1100011
Average SNR 40

2 lens system: Fourier transform along Y,
Imaging along X with magnification d2/d1

Single element system: Fourier transform along Y,
Imaging along X with magnification $M = f'y / d'$

| Error | 2 lenses | OCDL | Hybrid lens |
|---|---|---|---|
| | 15800 | 950 | 193 |
| Total length | 216 mm | 295.4 mm | 330.6 mm |

Figure 12

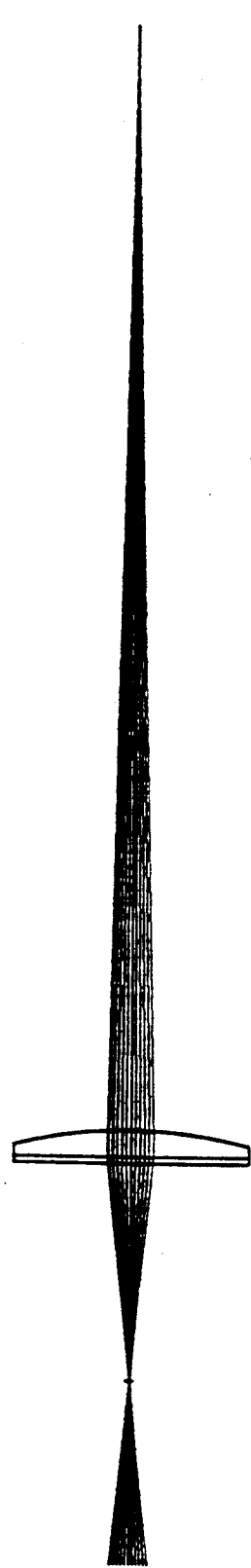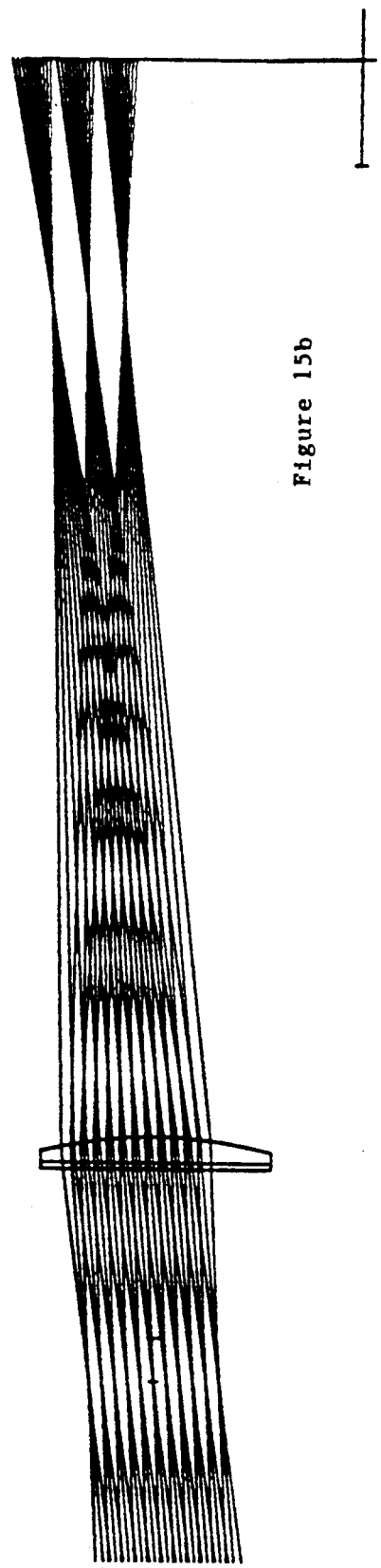

M = Number of memory pages
N = Size of a page $$c_k = \sum W_{ijk} x_{ij}$$

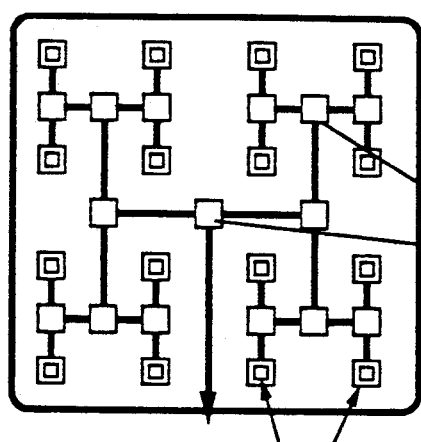
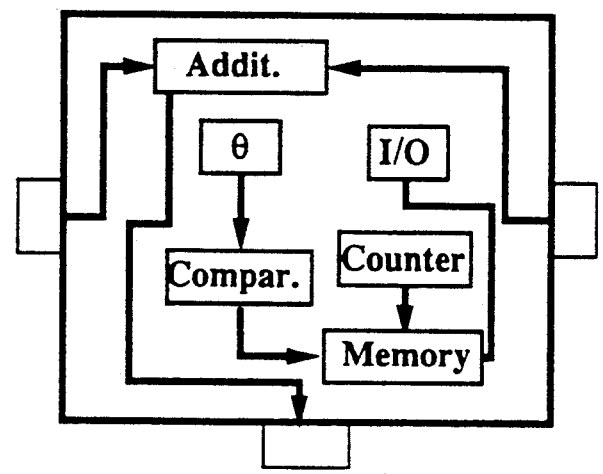
Fan-in Units
Detectors
+
XNOR Gates
Figure 23a
Figure 23b

MOTIONLESS PARALLEL READOUT HEAD FOR AN OPTICAL DISK RECORDED WITH ARRAYED ONE-DIMENSIONAL HOLOGRAMS

This invention was made by support of the U.S. Government under Contract No. RADC-30602-89-C-10145 acting through the United States Air Force, Rome Air Development Center (RADC). The U.S. Government has certain rights in this invention.

REFERENCE TO RELATED PATENT APPLICATIONS

The present patent application is related to U.S. patent application Ser. No. 785,408 filed on an even date herewith for an OPTOELECTRONIC ASSOCIATIVE MEMORY USING PARALLEL-READOUT OPTICAL DISK STORAGE to inventors Ashok V. Krishnamoorthy, Philippe J. Marchand, Gokce Yayla and Sadik C. Esener. The contents of the related patent application are incorporated herein by reference.

BACKGROUND OF THE INVENTION

1. Field of the Invention

The present invention generally concerns the reading of information from optical disks, and particularly concerns the parallel reading of one-dimensional holograms that are radially arrayed upon the surface of an optical disk at a high data transfer bandwidth.

2. Background of the Invention

Current secondary digital data storage systems, or memories, have low transfer rates relative to modern computer Central Processor Unit (CPU) processing speeds. Reference B. Robinson, "Grand challenge to Supercomputing," Electronic Engineering Times, 18 Sep. 1989. For memory intensive applications, this creates a performance bottleneck because the memory forces the CPU to wait for data.

Solid state disk drives, with storage capacities of typically 100 Mbytes, typically provide data transfer bandwidths no better than 10 Mbytes/second. Reference L. Curran, "Wafer scale integration arrives in disk form," Electronic Design, 26 Oct. 1989. Although projected developments in main memory technologies such as Static Random Access Memory (SRAM) and Dynamic Random Access Memory (DRAM) could provide bandwidths of 100 Mbytes/second, the capacity of these memories will likely remain severely limited (e.g., 1-10 Mbytes). Reference H. E. Maes et al., "Trends in semiconductor memories," Micro Electronics 20, pp 9-57, 1989; and S. Hunter, et al., "Potentials of two-photon based 3-D memories for high performance computing," Applied Optics 29, pp 2058-2066, May, 1990.

Optical disks are good candidates for secondary storage. They combine a high capacity (900 Mbytes for a 5¼" diameter disk), low cost ($1/Mbyte) and robustness (absence head crashes). There are three limitations for high speed operation of optical disk systems: the tracking, the focusing and the addressing functions. All these functions presently require mechanical motions of the head, which motions slow down the disk operation. Moreover the available disk technology is bit-serial sequential, only allowing data rates of up to, typically, 1 Mbyte/second.

It has been shown that optical disks can be read in parallel. Several different parallel readout systems have been proposed. Reference K. Kubota, et al., "Holographic disk with high data transfer rate," Applied Optics 19, pp 944-951, March, 1980; also D. Psaltis, et al., "Optical memory disk in information processing," Applied Optics 29, pp 2038-2057, May, 1990; and also J. Rilum and A. Tanguay, "Utilization of optical memory disk for optical information processing," in technical digest, OSA annual meeting 1988, paper M15.

It would be desirable if any or all of the mechanical motions, and the mechanisms, that are necessary to implement the tracking, focusing or addressing functions of an optical disk memory system could be eliminated, or at least simplified. Simplification, reduction in cost, improvement in shock or vibration tolerance, increased reliability, and/or improved accuracy (signal to noise, and lack of drop-out) of an optical disk readout system might each be desirable under certain circumstances—even if the disk data transfer rate and/or storage capacity were to remain the same, or potentially even to diminish. Alternatively, if the data transfer rate from an optical disk were to be increased by one or two orders of magnitude (the present invention will be seen to increase the data transfer bandwidth by more than three orders of magnitude), then this would be desirable under certain circumstances—even if some negative impact might result on other factors such as cost or reliability.

If an optical disk read out system that was simpler, environmentally harder, more reliable, and likely cheaper than existing optical disk systems, while offering a greatly enhanced data transfer rate, could be realized, then such a system would be interesting, and would seemingly be desirable. If such a new system could be implemented at low cost and with low risk using standard, presently commercially available components (as the system of the present invention will be seen to be), then such a system would be very interesting, and would seemingly be very desirable.

Moreover, a potentially new optical disk system with a "breakthrough" level of performance increase in its data transfer rate would not merely, by virtue of being faster, (i) contribute to the overall throughput of an existing computer data processing system, or (ii) be more generally usable with faster, "super", computers. Instead, such a new system—coupling the existing large capacities, low costs, and reliability of optical disk with a data transfer rate that is typically two orders of magnitude better than semiconductor memories—might render practical certain long-sought functions, and might make possible wholly new functions.

In this regard, it is particularly noted that an associative memory, or content addressable memory, of a practically valuable size and throughput (measured in bit-operations/second, as opposed to bits/second) has long been sought. Reference, for example, T. Kohonen, Self Organization and Associative Memory, Springer Verlag, 1984. The motionless head optical disk readout system of the present invention, and logical extensions thereof including extensions into a third media dimension, will be seen to be the basis of the OPTOELECTRONIC ASSOCIATIVE MEMORY USING PARALLEL-READOUT OPTICAL DISK STORAGE that is the subject of the companion patent application.

Because the motionless head optical disk readout system of the present invention will be seen to hold so much data (940 Mbytes in the preferred embodiment) and to realize its high data transfer rate (about 1.1 Gbytes/sec. in the preferred embodiment) by reading such data in very large words (16,384 bits/word, or a 128×128 pixel bit "image" in the preferred embodiment) at high rates (560,000 words/sec.); because one preferred use of the read words is to contain image data (128×128 pixels per word); and because the read out system is optically imaging, each retrieved word is sometimes called an "image". It will be understood by a practitioner of the art of high performance computer memory design that the size of each retrieved "word" from such an optical disk system in accordance with the present invention so greatly transcends the typical "word" widths of some 16, 32 or 64 bits that are commonly used in the CPU's of computers that such a optical memory "word" may, on occasion, be called something else. Namely, the very large word is typically called an "image". Use of the word "image"—such as is in "image processing" or "image recognition"—usefully suggests the advanced uses to which a very high data transfer bandwidth memory may be put. It will therefore further be understood by a practitioner of the art of high performance computer memory design that the word "image" is a term of art meaning a word, typically consisting of very large number of typically binary bits, that is retrieved from a high performance memory during each read cycle. The word "image" does not simply mean a pictorial or optical reproduction, nor, invariably, the data that permits of such a reproduction.

SUMMARY OF THE INVENTION

At its most overtly straightforward level, the present invention contemplates a motionless head for the parallel readout of an optical disk containing arrayed one-dimensional holograms.

At its detail levels, the present invention further contemplates (i) the encoding of optical media, normally optical disks, with arrayed one-dimensional holograms, including with (ii) specifically placed 1-D holograms that are computer-generated by new algorithms which are particularly suitable for permitting a high signal-to-noise ratio recovery of binary information that is contained within the holograms so placed, and (iii) lenses and lens systems, including a computer-designed Hybrid refractive/diffractive Optical Lens (HOL), suitable for transforming and for imaging arrayed one-dimensional holograms.

At its broadest level, the invention contemplates a new system, and method, for recording, and for reading, optically encoded information. Namely, a 1-D optical readout of arrayed 1-D optically-encoded holograms (which holograms are permissibly, but not necessarily, recorded in 1-D) produces a 2-D encoding of a wavefront of light.

1. A Motionless Parallel Readout Head for An Optical Disk

A parallel readout head for an optical disk in accordance with the present invention reads an optical disk that has an active surface encoded with a multiplicity of data blocks. Each data block is in the form of a substantially one-dimensional (1-D) hologram lying along a line segment. Each 1-D hologram is a computer-generated representation of one data set, or one word, or one slice of an image. A number of related data blocks collectively represent a universal data set, or many words, or a complete image. A group of (typically related) data blocks are positionally distributed, and positionally shifted or staggered one to the next, radially along the disk's active surface so as to fit a complete radius. A number of successive groups of data blocks are fitted along successive angularly-displaced radii of the disk, forming thereby a herringbone pattern.

During readout the encoded optical disk is simultaneously illuminated along the entirety of one of its radius lines within which a complete group of holographic data blocks are fitted. The illumination along a line is one-dimensional (1-D). The illuminated group of holographic data blocks are optically transformed in parallel by one or more lenses so as to two-dimensionally (2-D) spatially encode the wavefront of the light beam by which the group of holographic data blocks was illuminated. When the disk is rotated then the groups of holographic data blocks that are fitted along successive radius lines are successively retrieved, group by group.

This operation permits a fast, wide-bandwidth, retrieval of data. The data blocks, or 1-D holograms, typically encode 128 bits each. Typically 128 such data blocks, or 1-D holograms, are fitted along one complete radius of the disk. Accordingly, one complete image of 128×128 binary bits, or 16,384 bits, is encoded in the arrayed 1-D holograms fitted within any one radius of the disk. Some 14,000 different radii of the disk, angularly displaced by $1/7000 \pi$ radians one to the next, may typically fitted with the arrayed data blocks, or 1-D holograms. The optical disk typically spins at 2400 r.p.m. (40 r.p.s.). Because all the data within each radial array of (typically 128) data blocks, or 1-D holograms, is read out in parallel, the readout data transfer bandwidth is typically (40 revolutions per second)×(14,000 arrayed radii per per data block), or 9.175 Gigabits/sec, or 1.147 Gbyte/sec. The average access time is 12.5 msec. and the average retrieval time 25 msec. This rate is obtainable with a conventional 5¼" diameter, 1.5 micrometer track pitch, 1 micrometer pit size, high-capacity ($7.52 \times 10^9$ pits) low-cost ($1/megabyte), robust (no head crashes), 2400 r.p.m. compact optical disk (CD).

Moreover, in its parallel retrieval of multiple—not one but multiple—arrayed 1-D holograms—not data bits, nor data sectors, but 1-D holograms—at one single time, the motionless parallel optical readout head of present invention substantially alleviates troublesome prior requirements for tracking, focusing and, even, addressing.

There is no addressing required—optional synchronization of the recovery of successive images (typically 128×128 pixels), or words (16,384 bits), may be by but a single bit.

The stationary readout head need not, and does not, track in either the radial or angular ($\theta$) directions. This is because the data being read is preferably in the form of one-dimensional (1-D) Fourier-transform holograms. Due to the well-known property that a positional shift in the Fourier plane produces only a phase shift in the optical output—to which phase shift the photodetectors of the optical head are insensitive—any reasonable eccentricity of the optical disk, and/or of the holographic information recorded thereon, is of no consequence.

There are no dynamic focusing requirements for a normally flat optical disk (for which disk the surface wobble is typically less than 15 microns). A long depth-of-focus, small illumination-solid-angle, optical path focuses to a line of less than 22 micrometers width. Detection along this path incurs only a reduced signal-to-noise ratio, without appreciable risk of any loss of data, for a disk wobble of up to 20 microns.

These concepts deserve deliberation. The present invention does not merely ease previous requirements for tracking, focusing, and addressing during readout of an optical disk, it substantially overcomes these requirements. Although the present invention finds immediate application in reading holographically-encoded data from an optical disk, it will be recognized by a practitioner of the optical design arts that teaching of the present invention as to how to lift the burdens of tracking, focusing, and/or addressing in an optical read out system is extremely useful, and potentially adaptable, to any optical information retrieval system.

The motionless readout head optical disk supports a high data throughput that is particularly useful in artificial intelligence and supercomputing. It is particularly suitable as a component of an associative memory/content addressable memory operating on image data because its great data transfer bandwidth permits a binary image of typically 128×128 pixel points, one of a potential $1.4 \times 10^4$ such images encoded on a single compact disk, to be output more than $5.6 \times 10^5$ times every second.

As a trade-off incurred in realizing the high data transfer bandwidth, the informational density per pit, and per optical disk, is typically reduced times thirty-two ($\times 32$). This reduction is due to the recording of holographic (image) data at a redundancy that permits a true image (or data word) to be reconstituted at a desirably high signal-to-noise ratio, typically greater than 60 db.

This reduction, or trade-off, is not an absolute. First, many of the properties of binary-encoded holograms, including those expressed as pits on an optical disk, permit that the data contained in such holograms might reliably be read even if the individual bits (pits) were unsuitably small and close together so as to support conventional, bit-serial, data read operation.

Second, the holograms used in present invention are grey-code area-modulated. This means that individual bits, or pits, that are intrinsically binary, and either present or absent, are being used—typically in sets of 4 such bits (pits)—to encode a grey code level—typically 5 such grey code levels. (This quite remarkable concept means that the copius digital data output of the optical disk system in accordance with the present invention is derived, at the level of the encoded optical disk, from a grey code, or an analog signal on the scale from white to black.) The use of binary bits (pits) to encode a grey code is a consequence of the optical disk technology used. Obviously if the optical disk may be directly impressed with just a modest five levels of grey code then times five ($\times 5$) of the density reduction is immediately overcome.

The acknowledged trade-off of the present invention is simply that, in the preferred embodiment of the invention implemented with a commercially-available CD that is impressed with (holographic) data by conventional binary digital recording methods, the density of information storage on (but not retrieval from) the CD will be less than maximum.

2. Preferred Embodiments of the One-Dimensional Holograms, and of a System of Lenses for their Transform and Readout The one-dimensional holograms read by the motionless readout head of the present invention may be computer-generated by several different algorithms. An iterative algorithm based on the existing Direct Binary Search (DBS) algorithm (the product of which algorithm further undergoes a Fourier transform, and still further manipulations, in order to generate the 1-D hologram) is preferred.

Two cylindrical lenses for both imaging and Fourier transforming the 1-D holograms on the optical disk during read out may be either (i) a orthogonal pair of cylindrical refractive lenses, (i) a orthogonal pair of cylindrical diffractive lenses (Orthogonal Cylindrical Diffractive Lenses, or OCDL), or (iii) a combination of an orthogonal cylindrical diffractive lens and a refractive lens. The imaging and Fourier transforming optical readout head is preferably (iv) a single Hybrid diffractive/refractive Optical Lens (HOL) that replaces the function of two cylindrical lenses and that corrects for aberrations.

3. Certain Broader Principles of The Present Invention

In accordance with the present invention, information is encoded, typically by a computer transform and not by an optical transform, in holograms. Because each hologram (i) is substantially along a line (although the line has a finite width), and (ii) encodes in a mathematically one-dimensional transform the data elements of a single one-dimensional set, it is spoken of as being "one-dimensional".

The 1-D holograms are optically recorded, typically but not necessarily on an optical disk, in arrays of parallel lines, and typically (although not necessarily) line by line. Howsoever recorded, the arrayed 1-D holograms are illuminated, and read, in parallel along a focal line that intersects, although not necessarily perpendicularly, the arrayed parallel lines of 1-D holograms. Just as the 1-D holograms have, in actual physical reality, finite widths, the focal line also has, due to the limitations of optics, a finite width. However, the focal line is conceptually one-dimensional, and could theoretically lack any higher dimension.

The holographically-encoded information contained within the arrayed 1-D holograms that are read out (in parallel) along the 1-D focal line is transformed in parallel by one or more lenses into a two-dimensional spatial encoding of a wavefront of light. This is the core of the invention: a 1-D optical readout of 1-D optically encoded holograms produces a 2-D encoding of a wavefront of light.

This two dimensionally spatially-encoded light wavefront is detectable by a corresponding two-dimensional array of light sensors in order to decode, at one time and in parallel, the data elements of many one-dimensional sets, or a universal set. Each one-dimensional data set that is encoded within an individual hologram may, for example, particularly represent the pixels of a slice of a digitalized image. Many one-dimensional data sets that are simultaneously decoded when an array of such holograms is read in parallel then, correspondingly, represent the entire image.

Accordingly, at its broadest level the present invention contemplates both (i) recording and (ii) reading holographic information at and in one dimension (1-D), and optically transforming the read information into the next higher, second, dimension (2-D).

4. The Significance of Optically Decoding Optically-Recorded Data at a Higher Dimensionality Than (i) That Dimensionality at Which the Data is Originally Encoded, (ii) That Dimensionality at Which the Data is Originally Recorded and (ii) That Dimensionality at Which the Encoded Recorded Data is Read In accordance with the present invention the spatial dimensionality at which optically-recorded encoded data is decoded is greater than the spatial dimensionality (i) at which the data was originally encoded, (ii) at which the encoded data is optically recorded, and (iii) at which the encoded recorded data is read.

In particular, in the preferred embodiment of the invention, one-dimensional holographic transforms that may be (as desired) recorded upon an optical media one transform in one dimension at one time, and that are illuminated (read) along a one-dimensional focal line in order to produce, when optically decoded, a light beam wavefront that is encoded in two dimensions. For example, a two-dimensional image may be completely (i) encoded in an array of one dimensional holograms, (ii) which one-dimensional holograms may optionally be recorded but one hologram along one dimension at one time (although they need not be so one-dimensionally recorded), (iii) which arrayed one-dimensional holograms are illuminated (read) along a one-dimensional focal line.

There are many beneficial effects from this astounding asymmetry.

First, the mathematical transforms that generate holographically-encoded data in one dimension (i.e., 1-D holograms) are not computationally onerous, and are generally faster of calculation than alternative transforms that encode data in two or more dimensions.

Second, one-dimensional (1-D) objects use but little area (theoretically zero area), and pack tightly. Consider: Once the one-dimensional holograms are mathematically derived, how many such 1-D holograms may be arrayed in a two-dimensional area? The theoretical answer is an infinite number! However, the practical limitations of optical recording and reading at adequate signal-to-noise ratios preclude that the holograms should be truly 1-D, and without any physical width. However, depending on optical technology, a obviously large number of 1-D holograms may be arrayed within a 2-D area.

Third, it is useful that the 1-D holograms may be recorded serially sequentially slowly in one dimension at a time, one hologram at a time—even though they need not be so recorded. It is easier, circa 1991, to write one minute region of a digital optical medium, such as by placing a pit in this region, than it is to write many such regions at the same time. Because many applications of optical memory stores require that the store should be written less often, and less quickly, than it is read, it is not adverse that information should be written on optical media serially, and relatively more slowly than it is read. After all, this is the way bulk magnetic media such as magnetic disks and magnetic tape commonly function. Conversely, it is certainly not necessary for operation of the that motionless optical readout head of the present invention that the 1-D holograms read should have been serially recorded, it is only permissible that they may have been so recorded. Indeed, once a master recording is obtained then duplicates may, under some conditions and for some optical technologies, be readily and quickly reproduced by processes akin to photography.

Fourth, it is beneficial that the arrayed 1-D holograms should be read along a 1-D focal line. It is easier, circa 1991, to image a line than an area. It may also be easier to move an optical media perpendicularly to a line in space at which an optical focus is maintained—as in the optical disk used with the motionless readout head of the present invention—than it is to move an optical media orthogonally to a planar area at which an optical focus is maintained (or, conversely, to hold still the media and move the focal plane). A line, even one of finite width, is more compact than an area. (This is not to imply that there is gain, or that fewer bits of data are encoded along the 1-D line than are recovered in the 2-D image. In fact, the opposite is true.) Therefore, it is generally easier to move more 1-D lines per unit time past a given point (or focal line) than it is to move 2-D areas past the same point (or line).

In accordance with these several benefits, the present invention might be characterized as an optical recording and readout system that is fully tractably realizable with present optical disk technology. Indeed, because the readout head is motionless, the entire system of the present invention may actually be easier to implement that certain alternative Compact Disk (CD) technologies. Nonetheless to being readily implementable at low cost, the data transfer bandwidth of a parallel readout system in accordance with the present invention is impressively high. Indeed, the (optical) data transfer bandwidth is so high so as to permit the realization of functions, such as an Associative memory, that have heretofore been difficult of being realized at any practically useful scale and speed.

Perhaps the most astounding implication of the present invention is that, in the future and as an extension of the principles of the present invention, recreations of data in three dimensions may be derived from information that is holographically recorded in two dimensions. The properties of a two-dimensional hologram to record a three-dimensional image are well known. However, the management of holograms, and holographic recording, for the reconstitution of digital binary data at a higher dimension than that dimension in which the data was stored has not previously been known. Reconstitution of digital binary data in three dimensions from two-dimensional optical media permits, among other potential applications, three-dimensional television and the creation of three-dimensional objects by stereolithography.

These and other aspects and attribute of the present invention will become increasingly clear upon reference to the following drawings and accompanying specification.

BRIEF DESCRIPTION OF THE DRAWINGS

FIG. 7 is a Table 1 showing a comparison of encoding methods for 1-D holograms.

FIG. 8 is a plate, corresponding to an actual microphotograph, of 1-D holograms according to the formats, and in the layouts, of FIGS. 1, 2, and 5 recorded on an E-beam test plate (not an optical disk, but equivalent thereto) using the identical 1 $\mu$m pit size and 1.5 $\mu$m pitch as is used upon the optical disks that produce the images of FIGS. 10 and 16.

FIG. 12 is a Table 2 showing the results of a comparison of three different output lenses systems usable within the motionless parallel readout head in accordance with the present invention.

FIG. 15(a,b) is a diagram of the a ray tracing of a computerized analysis of a that preferred embodiment of a motionless parallel readout head in accordance with the present invention using a Hybrid refractive/diffractive Optical Lens (HOL) as shown in FIG. 11b.

FIG. 23a is a diagrammatic view, and FIG. 23b is a detailed view of a partial schematic diagram, of an Opto-Electronic Integrated Circuit (OEIC) based on an H-tree structure, and usable with the motionless parallel readout head for an optical disk recorded with arrayed one-dimensional holograms in accordance with the present invention, to implement an Associative memory.

DESCRIPTION OF THE PREFERRED EMBODIMENT

The present invention is embodied in a parallel readout system for optical disk. The preferred embodiment readout system has a data transfer rate, or bandwidth, of 1.1 Gbyte/sec and an average access time of 12.5 msec. The preexisting data accessed by the readout is written radially on the disk as arrayed one-dimensional (1-D) holograms. Data access is achieved solely through the disk rotation.

The parallel optical disk readout system of the present invention has as one of its advantages that absolutely no mechanical motion of the optical readout "head" is required for either access, focusing or tracking. The head is absolutely motionless. The following Section 1 introduces the system of the invention, and a preferred disk data encoding method with which the system is operative. Exemplary applications of the system of the invention, including an associative memory application, are described in section 2.

1. Motionless Parallel Readout System for Optical Disk

1.1 Disk Encoding

The readout system of the present invention is operative on a broad range of optical disks and optical technologies. It may be, for example, used with an industry standard Compact Disk Read Only Memory (CD ROM) of 5/¼" diameter with a 1.5 $\mu$m track pitch and a 1 $\mu$m pit size. The disk's active surface has a radius of 3 cm, and therefore contains 20,000 concentric tracks. The disk has a capacity of 940 Mbytes.

The preferred data encoding method with which the readout system is operative is arbitrarily parameterized so as to permit reconstructions (output) of 128×128 pixel bit images at a high signal to noise ratio (SNR) of 60 Db. This high SNR effectively means that the image data, or "word", that is recorded is the exact same image data, or "word", that is retrieved, and that there is insignificant read error. The SNR is readily adjustable both upwards—at the expense of recording density——and downwards—to the benefit of recording density—as is desired, all in a manner hereinafter explained.

Figure 1:
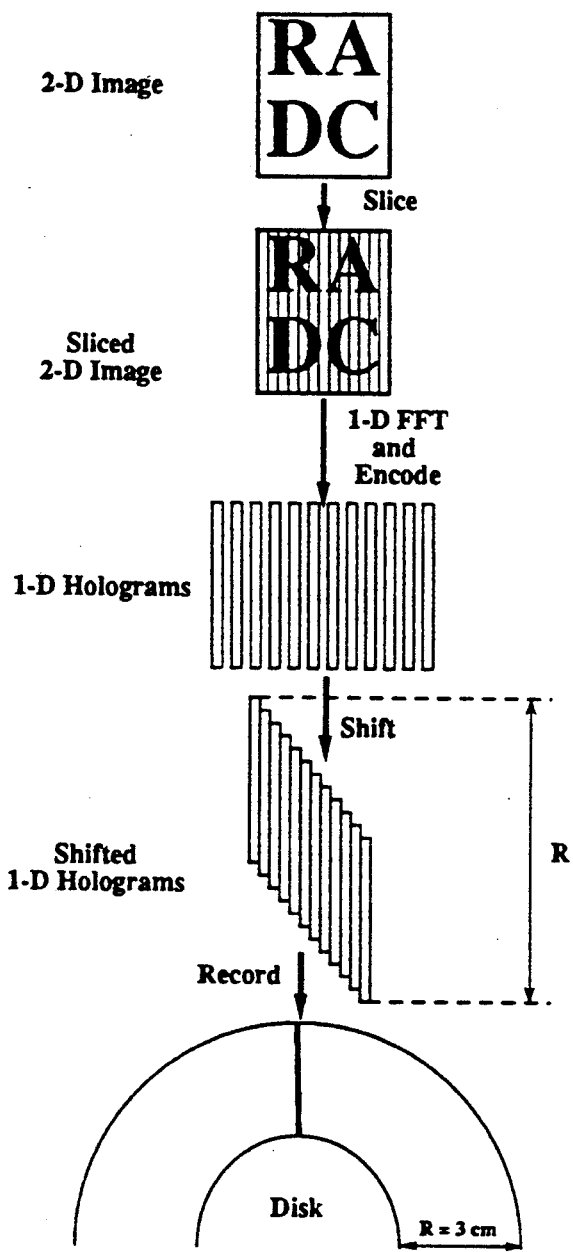
FIG. 1 is a diagrammatic representation of a method of encoding data onto an optical disk in accordance with the present invention by the steps of (i) digitalizing a 2-D image, (ii) slicing the 2-D image into 1-D columns, (iii) Fourier transforming, and encoding each of the 1-D columns to produce a corresponding 1-D hologram, (iv) shifting the 1-D holograms so that a shifted plurality of such fit the radius of an optical disk, and (v) recording the 1-D holograms along a one radius (of many such) upon an optical disk.

As illustrated in FIG. 1, the data blocks are 1-D Fourier transform Computer Generated Holograms (CGH) each of which is calculated to reconstruct one column of 128 pixels. One hundred and twenty-eight (128) of these blocks (1-D holograms), representing one image (or word) of 128×128 pixels (16,384 bits), are distributed along the radial direction of the disk's active surface, and are shifted radially from one another to fit a complete radius. Successive radial arrays of 128 blocks, or 1-D holograms, each are themselves displaced laterally one from the next, and are arrayed circumferentially around the annular surface of the disk. A disk encoded in this way has a capacity of approximately 14,000 radial arrays, each of which contains one 128×128 pixel bit image, or one 16,384 bit word.

Figure 2:
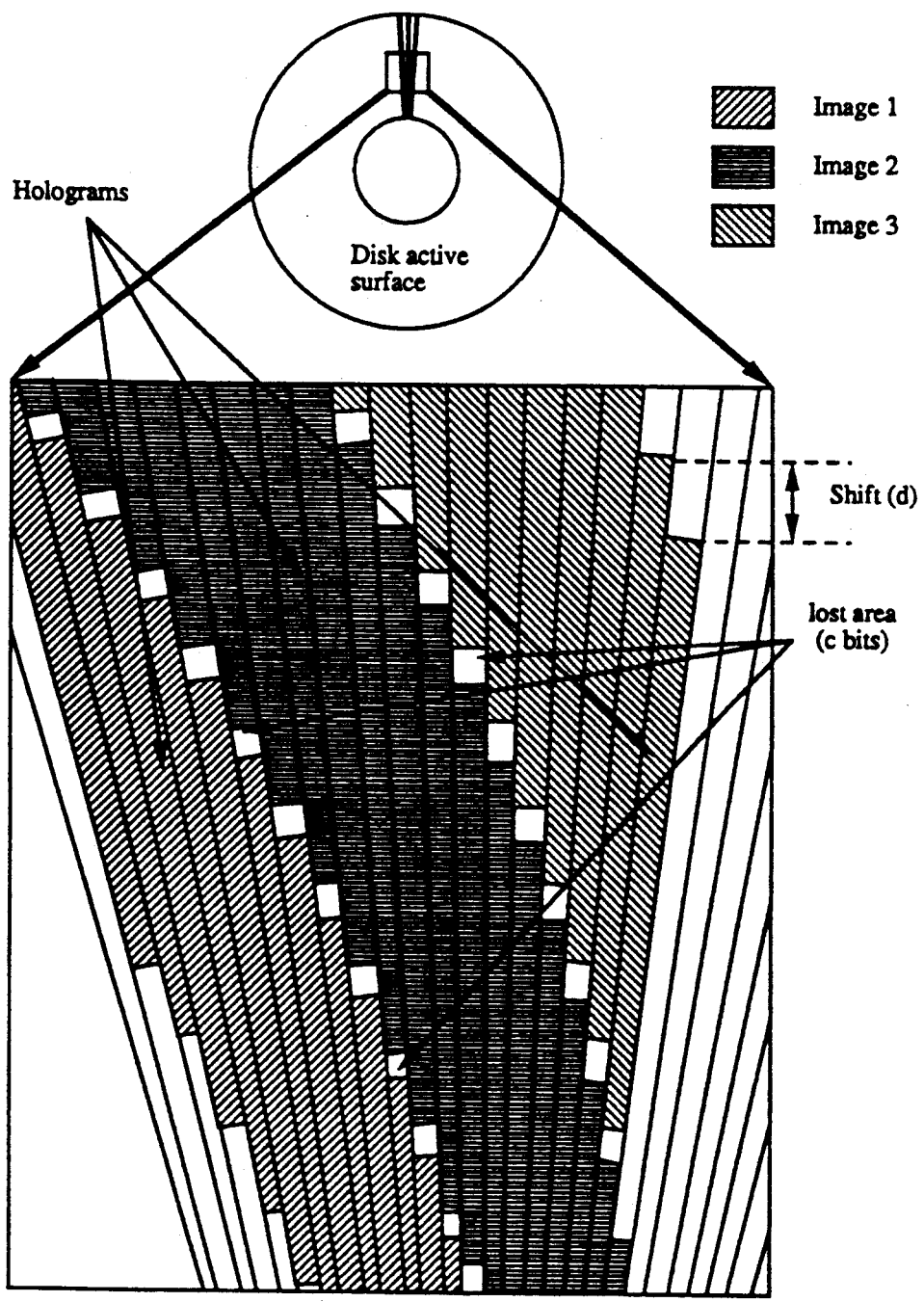
FIG. 2 is a diagrammatic representation, partially at an expanded scale, of the data layout on the optical disk of the present invention recorded by the method illustrated in FIG. 1, which data layout includes plural data images each consisting of a number of radially-arrayed 1-D holograms which holograms are laterally shifted relative to one another within each data image, and which arrays of 1-D holograms are circumferentially shifted one array to the next circumferentially around the optical disk.

Successive 2-D images are encoded and recorded along subsequent radial lines of the disk, as shown in FIG. 2. Conventional e-beam lithography may be used, as is discussed in greater detail hereinafter, to fabricate such an optical disk having the indicated layout of the 1-D holograms.

1.2 Optical Readout System

Figure 3:
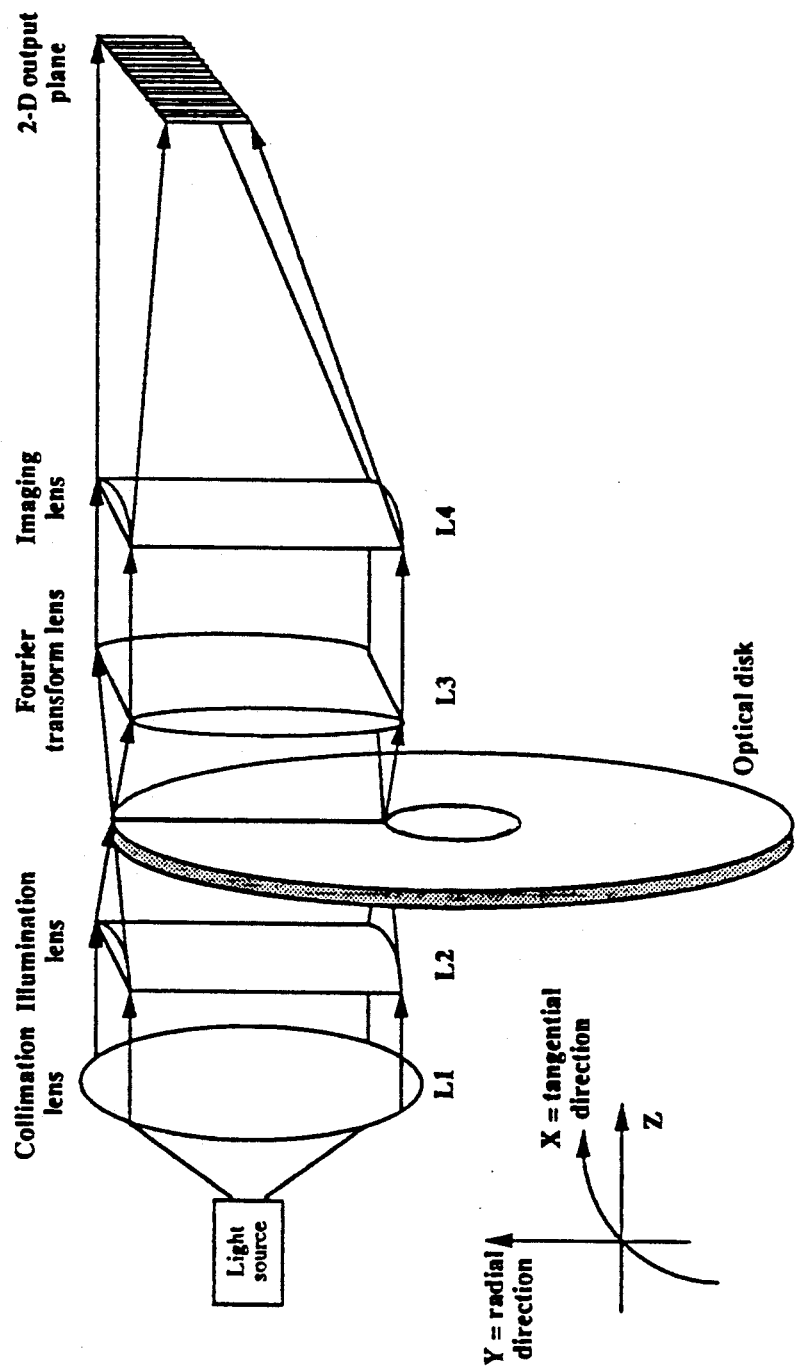
FIG. 3 is an optical schematic diagram of one embodiment of a motionless parallel readout head for an optical disk recorded with arrayed one-dimensional holograms in accordance with the present invention, which embodiment uses two orthogonal cylindrical refractive lenses in the output imaging and transforming.

One preferred embodiment of an optical readout system in accordance with the present invention is shown in diagrammatic form in FIG. 3. The system serves to map the 1-D data distribution on the disk to a 2-D image at the output.

The particular embodiment shown in FIG. 3 makes use of a refractive optical system, namely the two orthogonal cylindrical lenses L3 and L4, for parallel readout of the disk. Other optical systems, including a preferred system using a Hybrid refractive/diffractive Optical Lens (HOL) are possible, and are discussed hereinafter. The optical system of FIG. 3 is exemplary in the following explanation of the principles of the present invention, but should not be held to be limiting of the invention.

A monochromatic, spatially coherent (laser) light source is collimated by lens L1 and focussed to a nearly radial line on the disk by a slightly rotated cylindrical lens L2. The radial line illuminated by Lens L2 is normally equal in length to the entire radius of the annulus of the disk's active surface. Therefore 128 data blocks, or 1-D holograms, are illuminated simultaneously (reference FIG. 2). This single set of one dimensional holograms that is illuminated at one time is sufficient to reconstruct one 2-D image.

Following the disk in the optical path from the Light source to the Output plane are two orthogonal cylindrical lenses L3, L4. The first lens Fourier transforms the holograms arrayed along the radial (vertical) direction. The second cylindrical lens L4, images, and typically also magnifies, the holograms in the tangential (horizontal) direction onto the Output plane. Both the cylindrical lenses L3, L4 have as their focal planes the Output plane. The result of the imaging and transformation produced by both lenses L3, L4 is that the individual Fourier hologram reconstructions appear in the first diffraction order above the axis, imaged side by side. In the preferred parameterization, a full 128 1-D holographic data blocks are read simultaneously, permitting reconstruction of a binary image of 128×128 pixels on the output plane.

As the disk spins, successive radial lines of 1-D holograms are illuminated. The result is that the output image on the Output plane changes corresponding to the recorded information. Thus, all information stored on the disk can be retrieved in one single rotation of the disk while the "head", or all lenses, remains motionless. Due to the shift-invariance and information redundancy properties of the Fourier transform, there is no need for tracking or focussing mechanisms.

Because no mechanical motion of the head is required to access any image stored on the disk, the entire contents of the disk can be retrieved in one rotation of the disk. A high data transfer bandwidth can accordingly be achieved. For a preferred nominal disk rotation speed of 2,400 rpm (40 rps), the data retrieval (transfer) rate, or bandwidth, is then 1.1 Gbytes/sec. The average image, or word, access time is 12.5 msec, and the maximum retrieval time is 25 msec.

The beam illuminating the disk and its arrayed holograms converges along the tangential direction, and is a plane wave along the radial direction. The preferred width of the area containing the data blocks of one image is 22 $\mu$m. A relatively large f-number lens (L1) is used to ensure a small illumination solid angle Therefore, the depth of focus is large ($>\pm 10$ $\mu$m). This Lens L1 is placed out of focus, and at a distance calculated to allow the illuminating beam to be slightly smaller than 22 $\mu$m at the disk plane. A wobble of up to 20 $\mu$m due to flatness variations of the spinning surface can therefore be tolerated.

In addition, due to the hologram information redundancy, even partially illuminated holograms permit reconstruction of the entire data. For example, a severe loss of as much as 10% of the hologram information induces a reduction of only 3 dB in the reconstruction Signal to Noise Ratio (SNR). Reference K. Kubota, et al., "Holographic disk with high data transfer rate," Appl. Opt. 19, pp 944–951, March, 1980.

For these reasons, no focusing servo is required.

Moreover, no tracking servo is required either. As discussed in the previous section 1.1, the data on the disk is encoded as 1-D computer generated Fourier holograms. Because Fourier-transform holograms are shift-invariant, the eccentricity (radial motion) of the spinning disk does not affect the reconstruction of the data. Therefore no tracking servo is required.

Additional embodiments of the optical readout system, which embodiments particularly employ different lenses to perform the Fourier transformation and the imaging and magnifying functions, will be further discussed in section 1.6 hereinafter. For the moment, however, it is useful to understand more about the nature of the 1-D holograms that the motionless readout head of the present invention serves to read.

1.3 Two Preferred Methods of Hologram Generation

The manner, and the parameterization, of the holographic data encoding on the disk are key factors in the optimal operation of the parallel readout system. The quality of the image reconstruction, and also the size of the hologram (and therefore also the capacity of the disk), both depend on the holographic encoding.

The encoding of the 1-D holograms is a combination of (i) parameterization of the holograms, meaning how many bits (pits) each hologram will contain and, correspondingly, how much area it will occupy; (ii) the placement of the holograms; and (iii) the mathematical generation of the holograms. The system of the present invention will work with 1-D holograms generated by many different algorithms. However, more cleverly generated holograms promote better system SNR, density, data transfer rates, etc. Less cleverly generated holograms do the opposite.

The first criterium of hologram generation is to make an informed, and well-considered, compromise between the quality of image reconstruction and the disk capacity. Due to the nature of the data recording on a preferred CD ROM, the holograms must be binary. (Optical disks that can record non-binary, analog, holograms may correspondingly be used with a motionless readout head in accordance with the principles of the present invention. However, such disks are not so readily available, nor so economical, as is standard CD ROM technology circa 1991.)

Taking into account all these requirements, the present invention contemplates two new Computer Generated Hologram (CGH) encoding methods which have been developed specifically for creating superior 1-D holograms for use with the motionless optical readout head of the present invention. Both of the preferred hologram encoding methods are based on a grey level encoding scheme using area modulation, and may be compared to existing methods.

Figure 4:
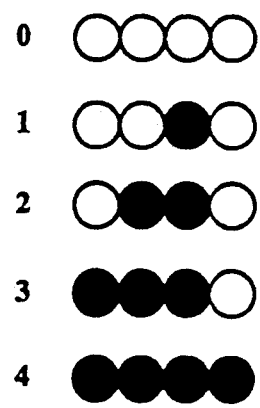
FIG. 4 is a diagrammatic representation of the grey scale of a hologram grey level area-modulated encoding used in recording the 1-D holograms on the optical disk in the system of the present invention.

In the first preferred encoding method, each column of the $N \times N$ pixel image to be stored on the disk is used as the 1-D input image (C) for which an hologram of size $K \times N$ will be computed. The binary array (C) is then embedded with a specific shift m into a 1-D array (0) of size M of which all elements are zeros. A random phase is then multiplied to this new input array, and its 1-D Fast Fourier Transform (FFT) is computed. The real part is extracted, and a bias equal to its minimum is added to it in order to make all the values positive. Each sample value obtained is quantized to n grey levels on a $n-1$ bit pattern using a density modulation algorithm. The grey scale, consisting of 5 grey levels, to which each sample value is quantized is shown in FIG. 4.

Figure 5:
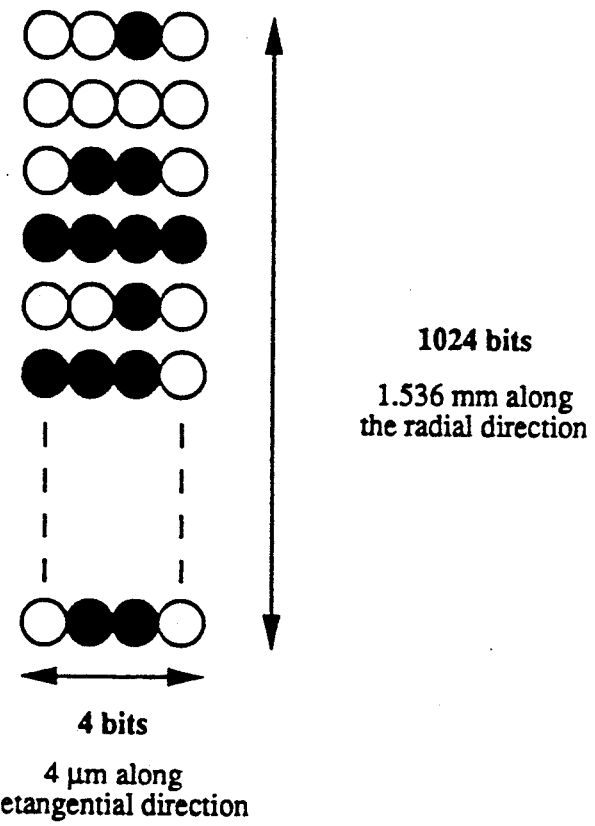
FIG. 5 is a diagrammatic representation of one data block, or one 1-D hologram, used on the optical disk in the system of the present invention.

In order to reduce speckle in the output 2-D image the resulting binary hologram is replicated once to generate a 2M cells of $(n-1)$ bit data block. An example of such a data block (containing arbitrary information) is shown in FIG. 5. For the preferred system of the present invention where 2-D images of $128 \times 128$ pixels are stored so as to be retrieved in parallel at a single time, the 128 bits of each column are encoded in a 512 cell holograms with 5 grey levels. Therefore the hologram after replication is a $4 \times 1024$ bits data block. Using a larger number of grey levels reduces the disk storage capacity but also increases the output SNR. Accordingly, and depending on the application, SNR can be traded off for capacity, and vice-versa.

Further in accordance with the present invention, it is possible to improve greatly the performance of the holograms by calculating them with an iterative algorithm. A preferred algorithm in accordance with the invention is derived and adapted from the Direct Binary Search (DBS) algorithm discussed by M. A. Seldowitz, J. P. Allebach, and D. W. Sweeney in "Synthesis of digital holograms by direct binary search," Appl. Opt. 26, pp 2788–2798, July, 1987. The adaptation of the DBS algorithm is, among other purposes, to make it compatible with the grey-level area-modulated encoding method described previously.

Figure 6:
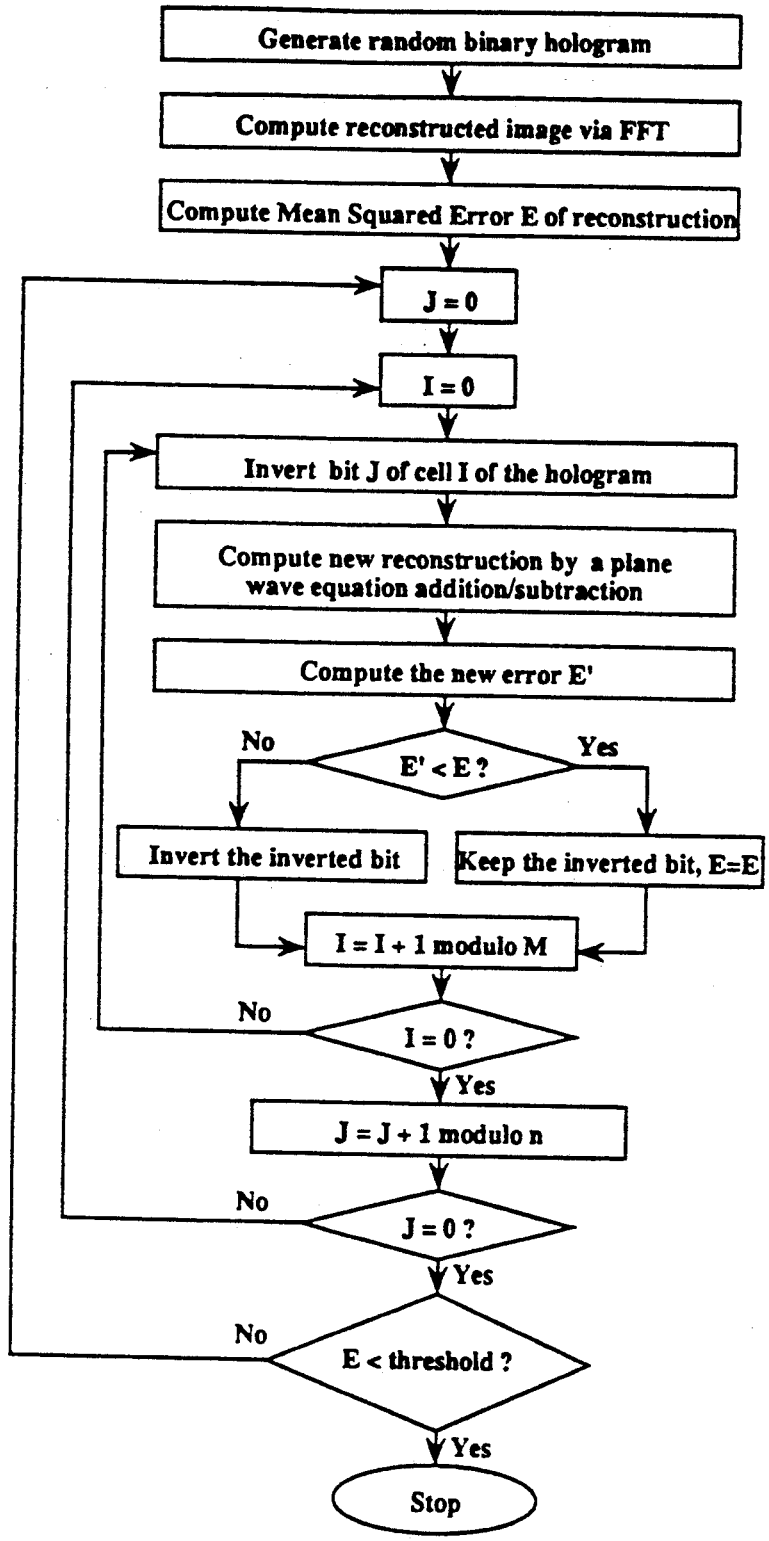
FIG. 6 is a flow chart of a preferred, iterative, transform algorithm, executable in a digital computer under software control, for the computation of 1-D grey-level holograms such as are shown in FIGS. 2 and 5, and such as are used written on and read from the optical disk in the system of the present invention.

The flow chart of the modified and adapted DBS algorithm in accordance with the present invention is shown in FIG. 6. A random grey level hologram is first generated. The reconstruction of this hologram is then computed by a Fast Fourier Transform (FFT). An error function is calculated by comparing the intensity of the reconstructed image and the original image to be reconstructed. The bits of each cell of the hologram are then inverted one after another, a new reconstruction being computed each time. However, with the iterative algorithm it is not necessary to use an FFT, since changing one bit of the hologram is equivalent of adding (bit changed from 0 to 1) or subtracting (bit changed from 0 to 1) a plane wave to the previous reconstruction. The error between the new reconstruction and the original image is calculated. If the new error is smaller than the previous one then the change of the bit is maintained and the new error is memorized. If not then the change is ignored. A loop is completed when the n grey levels of the M cells of the hologram have been tested. The iterative process continues until a predetermined number of loops are completed (ctr), or until the error is lower than a preset threshold, or until all the changes are ignored during one complete iteration.

FIG. 7 shows a Table 1 comparing (i) the preferred Fourier transform 1-D hologram encoding method of the present invention ("FFT Grey level $4 \times 1$), and (ii) the preferred modified and adapted DBS 1-D hologram encoding method in accordance with the present invention ("Iterative Grey level $4 \times 1$"), with other binary encodings. The image reconstructions obtainable with each encoding method (with the system of the invention) were simulated on computer. The comparison criteria were: the diffraction efficiency and the contrast ratio. The diffraction efficiency is defined as the ratio between the intensity of the reconstructed image and the total intensity of the reconstruction. Two different cases are defined for the contrast ratio. The average contrast ratio is computed by taking the ratio of the average intensity of the "1" bits over the average intensity of the "0" bits. The worst case contrast ratio is the ratio between the lowest intensity of a "1" bit and the highest intensity of a "0" bit. The values of the Table 1 of FIG. 7 are an average for 128 holograms. Holograms of size 4×1024 bits (pixels) were used for the evaluation of all the encoding methods.

The "Cell Oriented" method of Table 1 (shown in FIG. 7) is similar to one proposed by Psaltis. See D. Psaltis et al.,"Optical memory disk in information processing," Appl. Opt. 29, pp 2038-2057, May 1990. However, only the phase is encoded by variation of the position of "1" bits in a cell. The "Error Diffusion" method is as defined by R. Hauck and O. Bryngdahl in "Computer-generated holograms with pulse-density modulation," J. Opt. Soc. Am. A 1, pp 5-10, January, 1984. Finally, both the "FFT Grey level" method and the "Iterative Grey level" methods are described in this specification.

Table 1 of FIG. 7 shows that the preferred iterative method in accordance with the present invention gives the best results. However the iterative algorithm should be carefully implemented on the computer in order to optimize the computing time for the holograms. The calculation time of the holograms is normally no obstacle to the efficient and effective use of the system of the present invention in any case because the holograms are computed, and subsequently written to the optical disk by conventional methods, but one time only, but are typically used many times.

1.4 Experimental Results

Experiments were conducted to test the preferred hologram encoding methods in accordance with the present invention, as well as to validate the disk data layout and the entire optical system. For a first series of experiments, holograms were recorded on glass plate with an electron beam recorder (EBR) using the same feature size as an actual optical disk (1 μm spots with 1.5 μm radial pitch, see FIG. 5). Once the holograms were calculated, they were processed by a holographic CAD program which generated data files for the EBR.

A contemporary reference to such a process—which reference may or may not precede the filing date of this application depending upon the date of its publication—is H. Fahroosh et al., "A knowledge-based system for design of electron-beam fabricated computer generated holograms," submitted to Applied Optics. The process by which the calculated binary data—which data in fact constitutes the arrayed one-dimensional holograms—is placed on an optical disk is, in any case, conventional, and is not dependent upon any particular, nor on any non-standard, CAD or recording methodology. It will be recognized by a practitioner of the optical disk recording arts that the holograms of the present invention are no more than data, and that the particular preferred method (i.e., EBR) and the particular preferred CAD software (i.e., the University of California at San Diego (UCSD) CAD program of Farhoosh, et al.) for writing such holograms to CD ROM are alternatives only, and are neither necessary to realization of the present invention nor limiting or defining of the present invention.

Several holograms were recorded on glass plates of 1.2 mm thickness with a chromium film of 100 nm thickness. The optical system used for reading the disk is shown in FIG. 3. The following lenses were used. The illuminating lens L2 was of a focal length f:=100 mm; an aperture of 50×60 mm; and an f/#= 2. The Fourier transform lens L3 was of a focal length f:=200 mm; an aperture of 60×50 mm, and an f/#=4. The imaging lens L4 was of a focal length f:=25.4 mm; an aperture of 22×60 mm; and an f/#=1.15.

Figure 9:
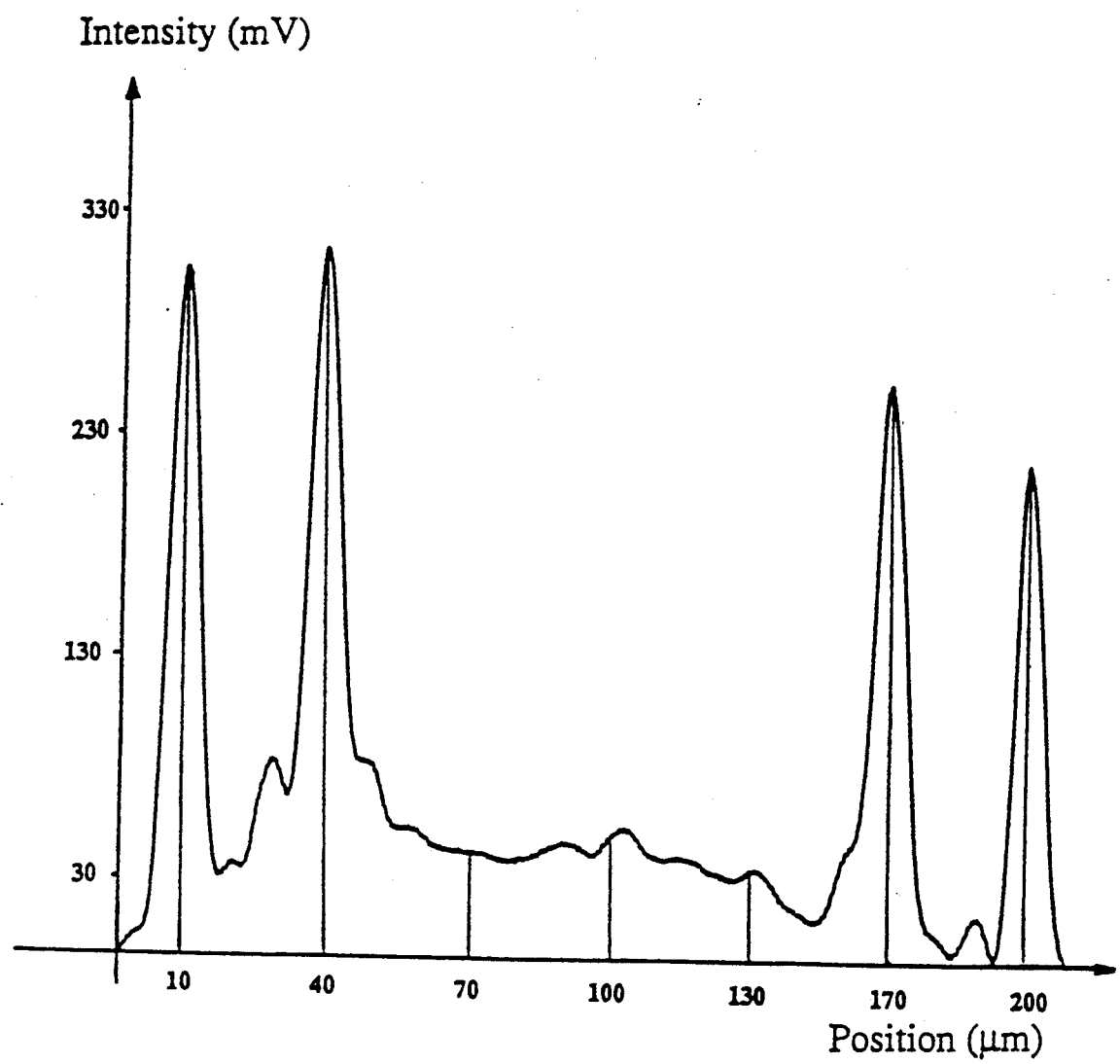
FIG. 9 is a graph showing the intensity measurement of an output image consisting of the bit sequence 1100011 as is present in a region of the E-beam test plate shown in FIG. 8, which FIG. 8 test plate and FIG. 9 graph show, in combination, that, as would be expected from established CD technology, the recording of binary bits on an optical disk is repeatable at high quality and good signal-to-noise ratio (SNR).
Figure 10:
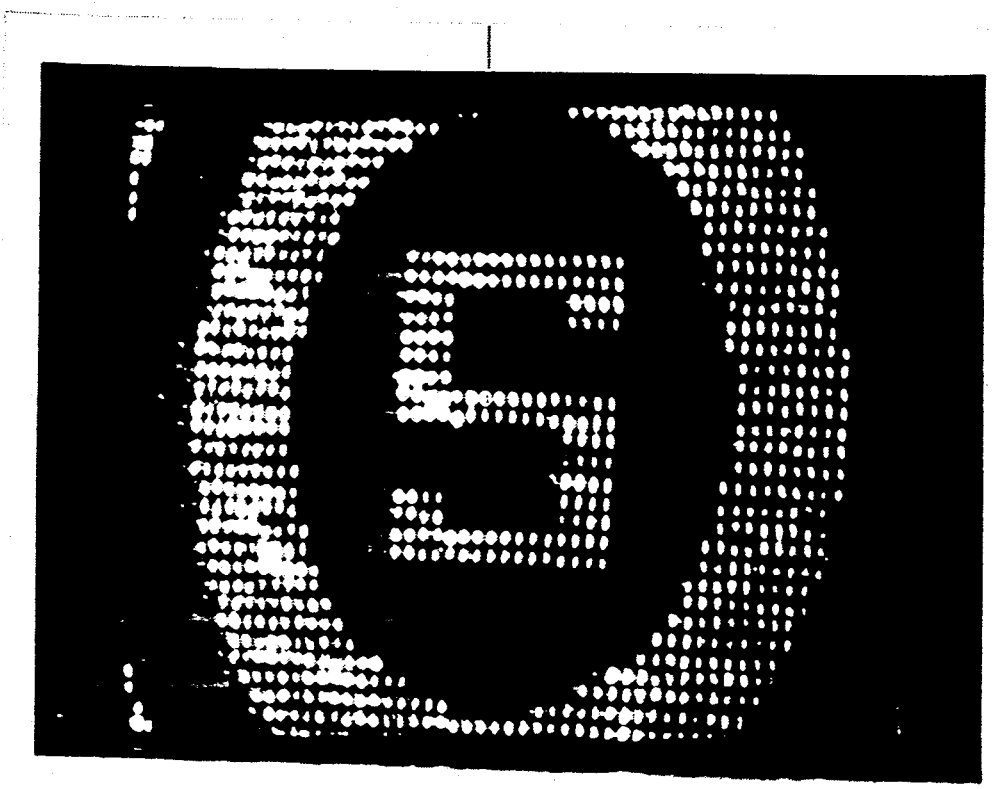
FIG. 10 is a plate showing the center portion of a 128×128 pixel point image reconstructed from a rotating optical disk read by the system of the present invention using the motionless parallel readout head shown in FIG. 3.

The plates were placed in the optical system on a rotation stage at the disk plane. Both static and dynamic measurements were conducted. The hologram reconstructions were analyzed. FIG. 9 shows the intensity of a part of a line in a 128×128 pixel reconstructed image. The bit sequence to be detected is "1100011". An average SNR of about 40 is measured. Static measurements revealed that focusing errors of up to 20 μm and tracking errors of over 1 mm could be tolerated without significant degradation of the reconstructed image. Dynamic tests have also been conducted. As expected, the position of the reconstructed images in the output plane does not move when the rotating disk moves laterally due to eccentricity. FIG. 10 shows the center portion of a 128×128 pixel image reconstructed from a rotating disk.

1.6 Alternative Lens Design, Including a Hybrid Lens

The parallel readout optical disk system previously shown in FIG. 3 includes two separate cylindrical lenses having different focal lengths: one for imaging in the X-direction, and one for Fourier transforming in the Y-direction. Besides being bulky and heavy, these cylindrical lenses (i) are extremely difficult to align and (ii) suffer from severe aberrations.

Figure 11A:
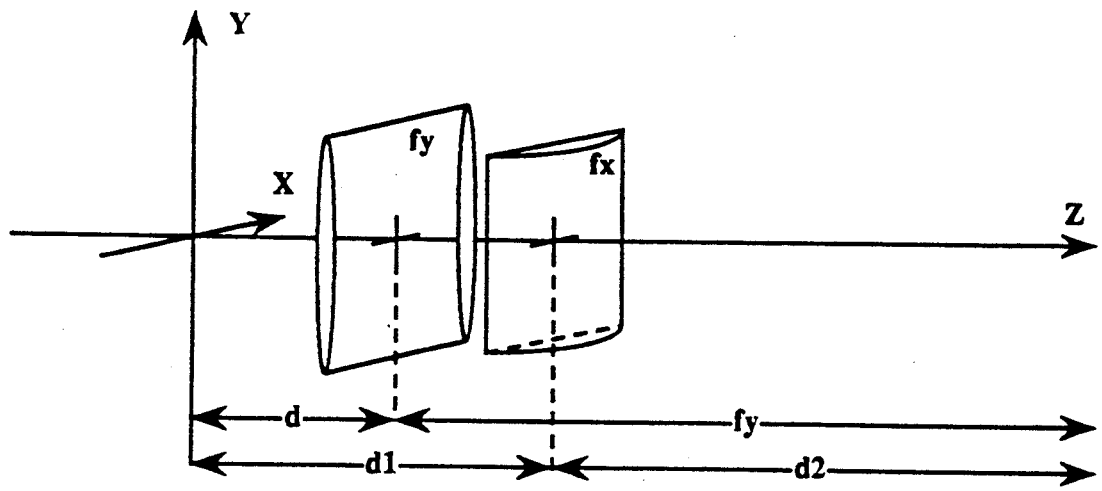
FIG. 11, consisting of FIG. 11a and FIG. 11b, is a diagrammatic representation of the replacement of the two orthogonal cylindrical refractive lenses shown in FIG. 3 and FIG. 11a with one Hybrid refractive/diffractive Optical Lens (HOL) shown in FIG. 11b.

CODE V ® optical design software (CODE V is a registered trademark of Optical Research Associates, Pasadena, Calif.) available from Optical Research Associates, Pasadena, Calif. has been used to design a single Hybrid Optical Lens (HOL) to replace the function of the two lenses and to correct for the aberrations. The optical systems evaluated are diagrammatically illustrated in FIGS. 11a and 11b, respectively showing the parameters of the compound, and of the hybrid, lens systems.

An immediate, first, insight gained from computerized optical analysis is that the function performed by the orthogonal cylindrical refractive lenses L3, L4 shown in FIG. 3 would better be performed by diffractive lenses. As shown in Table 2 of FIG. 12, because of the difference in focal lengths in the X and Y directions, it has been found advantageous to use orthogonal cylindrical diffractive lenses (OCDL).

1.5.1. Orthogonal Cylindrical Diffractive Lenses

Orthogonal Cylindrical Diffractive Lenses (OCDL) are particularly well suited for replacing the two refractive cylindrical lenses in the parallel readout optical disk system of the present invention. This section introduces the basics of OCDL necessary to follow the design process of the OCDL in the next section. A more detailed description of the operation and advantages of OCDL can be found in the previous publication of K. S. Urquhart, H. Farhoosh, and S. H. Lee, "Diffractive lens utilizing orthogonal cylindrical Fresnel zone plates," Proc. SPIE 1211, pp. 184-190 (1990).

OCDL make use of the fact that the quadratic phase function is separable in X and Y:

$$e^{\frac{j\pi}{\lambda f}(x^2+y^2)} = e^{\frac{j\pi}{\lambda f_x}(x^2)} e^{\frac{j\pi}{\lambda f_y}(y^2)}$$

The X and Y focal lengths are now independent. This allows the X and Y cylindrical phase functions to be quantized separately and then combined in a computer to make up the pattern file for fabrication. If $f_x$ and $f_y$ are equal, then the diffractive lens can be used for imaging like a normal diffractive lens. OCDL can be used equally well when $f_x \neq f_y$, as is the case for the optical disk readout system of the present invention.

Besides allowing independent X and Y focal lengths, OCDL also have the advantage that all of the fringes are made up of rectangles. This eliminates the fracturing of curved fringes into e-beam compatible shapes, which takes large amounts of data and time. Also, an e-beam lithography system can fabricate much smaller rectangular fringes than curved fringes.

1.5.2 Optical System Designs Comparison
1.5.3 Use of Optical Design Software CODE V ® optical design software (CODE V is a registered trademark of Optical Research Associates, Pasadena, Calif.) available from Optical Research Associates, Pasadena, Calif. was used to ray trace the elements of several optical systems suitable for use in the readout system of the present invention. The zoom (ZOO) option was used to separate the analysis into two distinct problems while studying one system. The vertical axis was used to optimize the system for Fourier transforming between the angles of +2.4° and +7.3° (first order reconstruction). The horizontal axis was used to optimize the system for imaging with a magnification of five. The horizontal image plane was forced to be coincident with the vertical Fourier plane.

For the designs that included diffractive lenses, the holographic optical element (HOE) option was used to model the diffractive lenses by specifying the coefficients of x2 and y2 (HCO C3, C5). In all cases, the automatic optimization (AUT) feature was used to alter the variables in the system in order to minimize the error function. The default error function in CODE Vt is simply a measure of the focus spot size obtained from the tracing of individual rays through the optical system.

1.5.3 Analysis of a Refractive Optical System

Figure 13A:
FIG. 13(a,b) is a diagram of the a ray tracing of a computerized analysis of a that embodiment of a motionless parallel readout head in accordance with the present invention using two orthogonal cylindrical refractive lenses, as shown in FIG. 3.
Figure 13B:
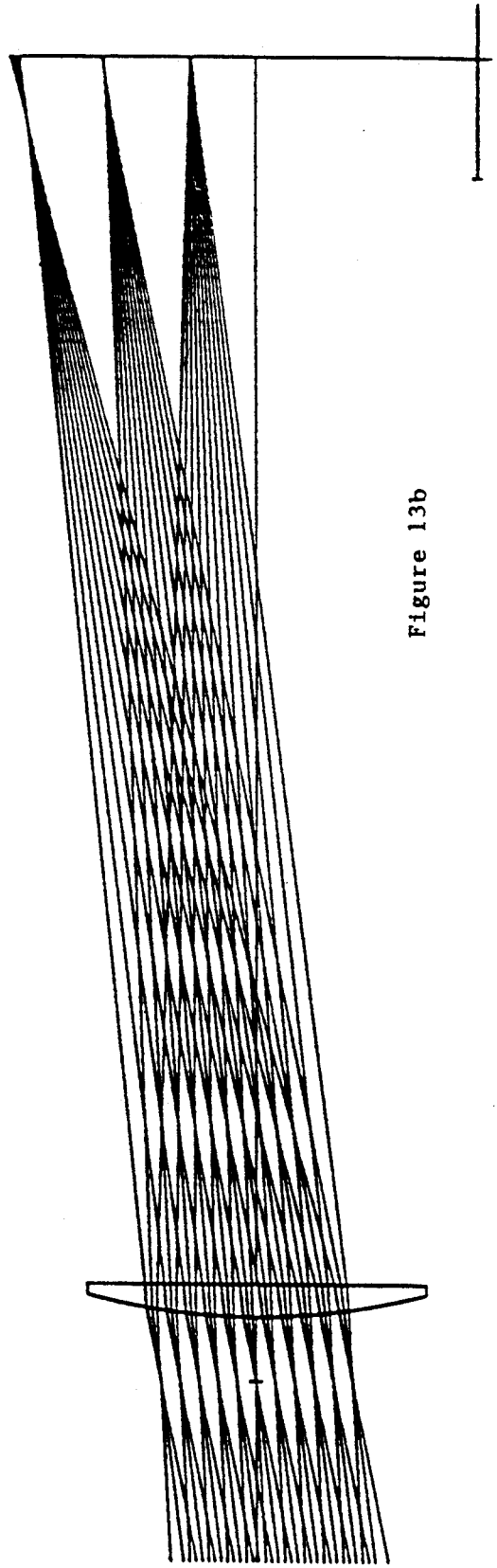

A first optical system analyzed for use in the readout system of the present invention is an all-refractive optical system made up of two cylindrical lenses. This is the optical system that was shown in FIG. 3 for implementing the parallel readout optical disk system of the present invention. FIG. 13, consisting of FIG. 13a and FIG. 13b, shows a ray tracing of the optical system as output from the CODE V software program. FIG. 13a is a top view showing the imaging function of the second cylindrical lens (f=25.4 mm). A side view of the same imaging function is shown in FIG. 13b. FIG. 13b also displays the Fourier transforming function of the first cylindrical lens (f=200 mm). The error function given by the CODE V software program was 15,837.

As can be seen by the beam spread in FIG. 13b, the Fourier transforming lens exhibits large amounts of spherical aberration. This means that rays from the top of the aperture are focussed below rays from the bottom of the aperture. Since holograms are stored along a radial line of the disk, reconstructions from one side of the 2-D image are shifted vertically with respect to the reconstructions on the other side of the image. This results in a reconstruction that is not rectangular, but is distorted due to non-horizontal lines of pixels.

1.5.4 Analysis of a Diffractive Optical System

If both cylindrical refractive lenses from the previous system of section 1.6.3 are replaced with cylindrical diffractive lenses, the system performance can be greatly improved. The first advantage is that now both lens functions can be placed in the same plane. This significantly reduces the effort needed to align the system since both lens functions can be fabricated on the same substrate and will be automatically orthogonal.

The second advantage is reduced aberrations.

Figure 14A:
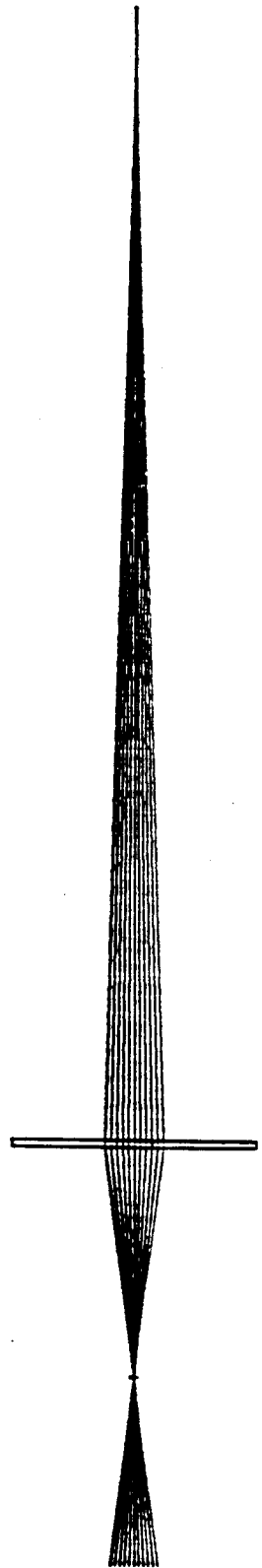
FIG. 14(a,b) is a diagram of the a ray tracing of a computerized analysis of a that embodiment of a motionless parallel readout head in accordance with the present invention using two orthogonal cylindrical diffractive lenses, which embodiment is within the Table 2 of FIG. 12.
Figure 14B:
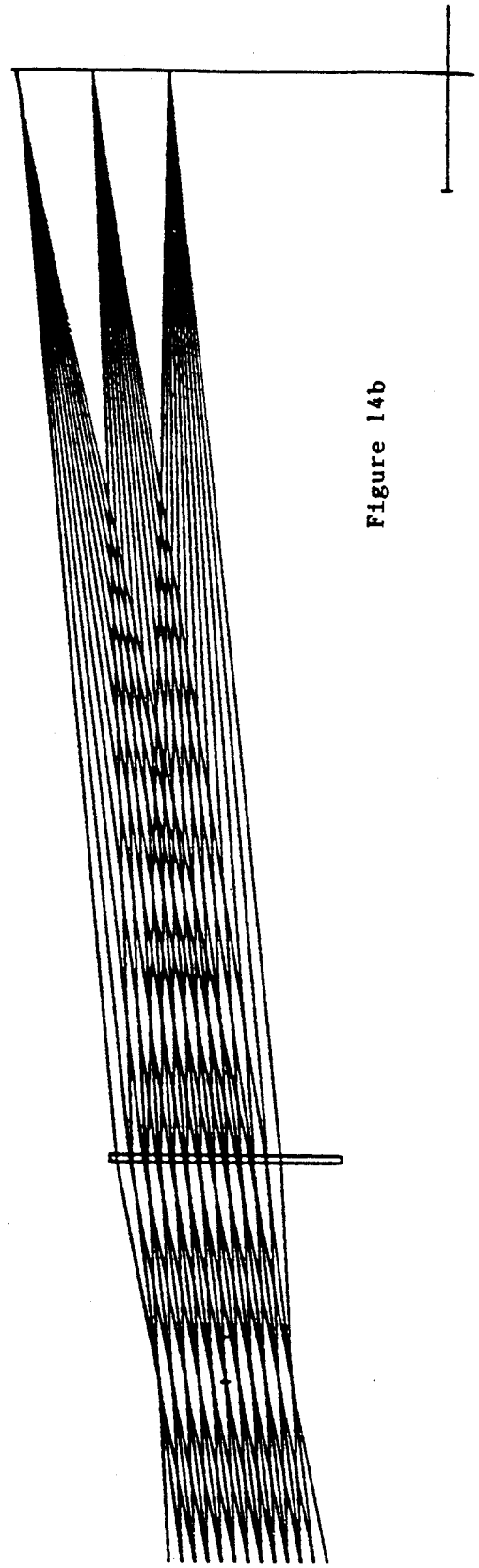

An analysis—equivalent to the analysis of FIG. 13—of an all diffractive lens system for use in the parallel optical readout is shown in FIG. 14, consisting of FIG. 14a and FIG. 14b. As can be seen by the beam spread in the FIG. 14b, the Fourier transforming lens continues to exhibit some amount of spherical aberration. However, as is also shown in FIG. 14b, the spherical aberrations can be partially eliminated due to the computerized design of the diffractive lenses.

The error function calculated by the CODE V software program is just 950.48 for this configuration, a reduction by a factor of almost 17 over the all refractive lens system. In this case, the imaging lens has a focal length of 41.7 mm, while the Fourier transform lens has a focal length of 250 mm. This yields a magnification of five in the imaging direction.

1.5.5 Analysis of a Hybrid Refractive/Diffractive Optical System

The aberrations can be further reduced if the cylindrical diffractive lenses are combined with a spherical refractive lens. This is illustrated in FIG. 15a,b, where the diffractive lenses are placed on the plano surface of the spherical lens. Optimization using the CODE V program yielded an interesting result. The aberrations were minimized for a spherical lens with a focal length of 200 mm, an imaging diffractive lens with a focal length of 52.7 mm, and a Fourier transform lens with a focal length of −946 mm. This combination yields the same effective optical power in the vertical and horizontal directions as the previous all diffractive case, but now one of the focal lengths of one of the cylindrical diffractive lenses is negative. The error function calculated by the CODE V program has now been reduced to 155.52, an improvement of more than 100 over the all refractive cylindrical lens case.

This configuration has the same alignment advantage as the all diffractive case, but now the f/# of both the diffractive lenses has been increased, particularly for the Fourier transform lens. This makes the fabrication of the diffractive lenses easier due to the resultant larger fringe spacing. An extra alignment step has now been introduced between the diffractive lenses and the spherical lens. Luckily, the analysis revealed that the two components could be misaligned laterally by up to 2 mm with negligible image degradation (error function <10), but there would be a small image shift in the output plane.

1.5.6 Experimental Validation of a Hybrid Optical Element Design

The hybrid refractive/diffractive element described in the previous section 1.6.5 was fabricated using an OCDL for the diffractive lenses and a Melles Griot 200 mm focal length spherical refractive lens. The diffractive lens was fabricated using well-developed binary optics techniques. Reference, for example, G. J. Swanson, "Binary optics technology: the theory and design of multi-level diffractive optical elements," Massachusetts Institute of Technology, Lincoln Laboratory, Technical Report #854, 17-24 (1989).

Four phase levels were used for a theoretical diffraction efficiency of 81%. The actual diffraction efficiency was not measured due to the lack of an actual focus spot, since the X and Y focal lengths were different. The minimum feature size fabricated was 1.3 μm in the horizontal direction by 5.3 μm in the vertical direction.

Figure 11B:
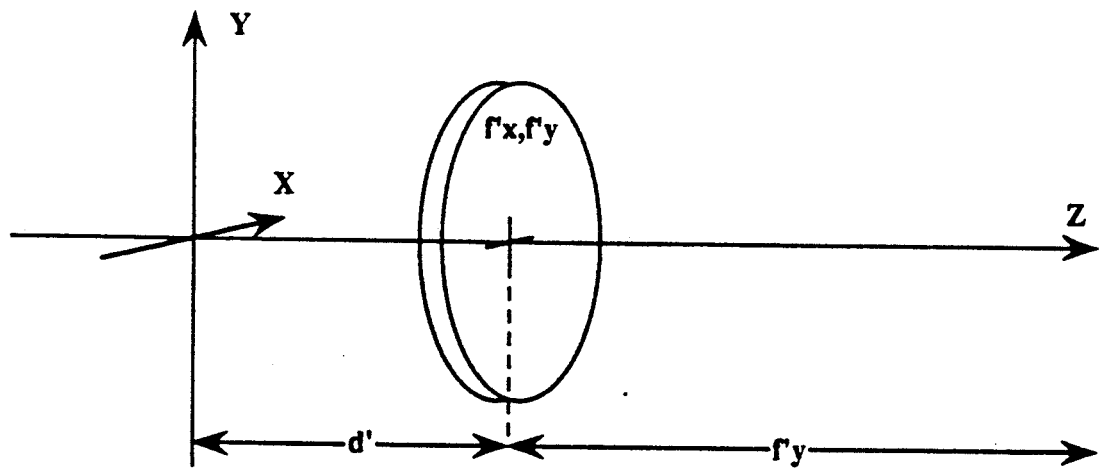
Figure 16:
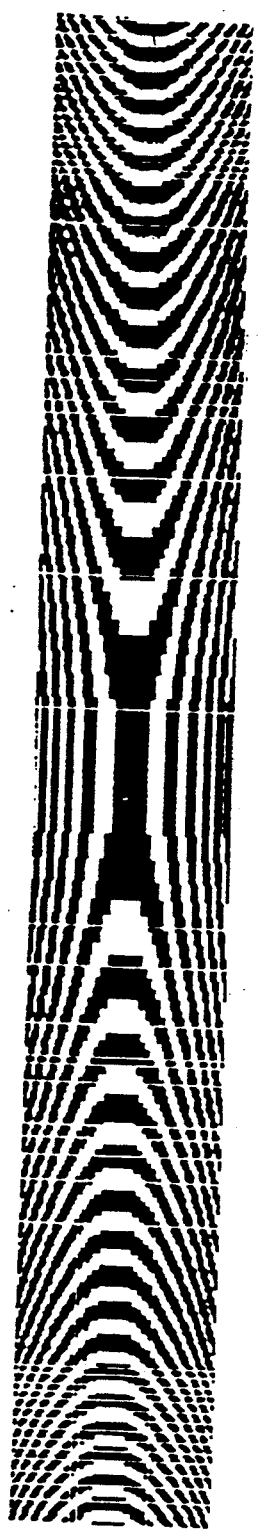
FIG. 16 is a magnified pictorial representation of a first mask, corresponding to a binary phase, used in the fabrication of the Hybrid refractive/diffractive Optical Lens (HOL) shown in FIG. 11b and analyzed in the ray trace diagram of FIG. 15.
Figure 17:
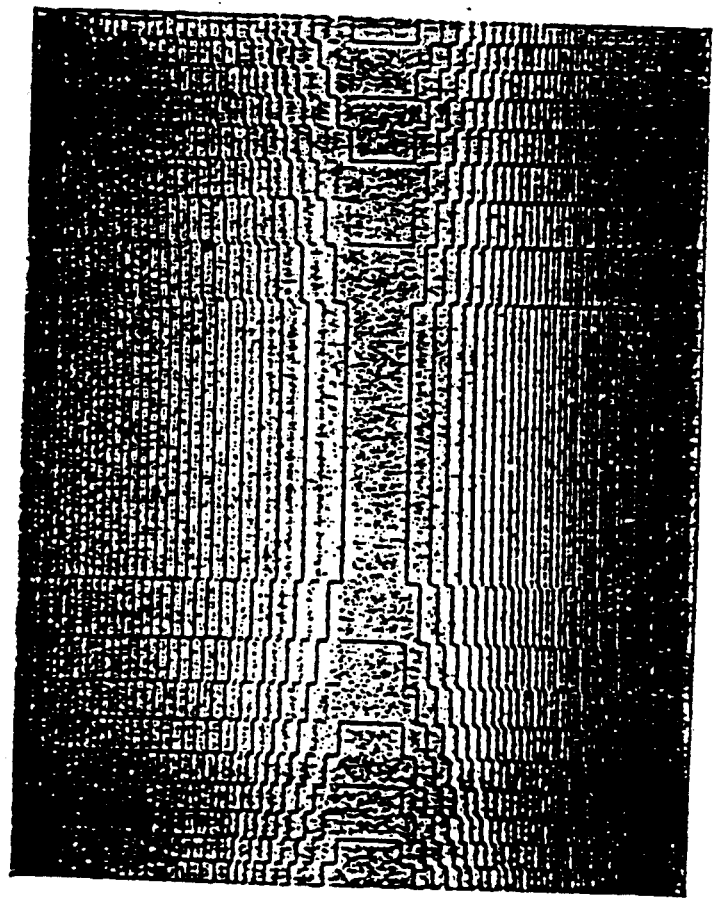
FIG. 17 is a plate showing a photomicrograph at 100×magnification of a central portion of a particular Orthogonal Cylindrical Diffractive Lens (OCDL) actually used in simulation of the optical characteristics of the preferred Hybrid refractive/diffractive Optical Lens (HOL) shown in FIG. 11b and analyzed in the ray trace diagram of FIG. 15.

A magnified pictorial representation of a first mask, corresponding to a binary phase, that was used in the fabrication of the Hybrid refractive/diffractive Optical Lens (HOL) shown in FIG. 11b and analyzed in the ray trace diagram of FIG. 15, is shown in FIG. 16. A 100×photomicrograph of the central portion of the OCDL is shown in FIG. 17.

Alignment of the diffractive lens to the spherical lens was accomplished with the help of alignment marks present on the diffractive lens substrate. As mentioned before, the alignment tolerance was very lenient, so the alignment was performed under a microscope at 50×magnification. It is estimated that the alignment accuracy was ±50 μm. Once aligned, the components were glued together, preferably with epoxy adhesive, at the edge of the spherical lens.

Figure 18:
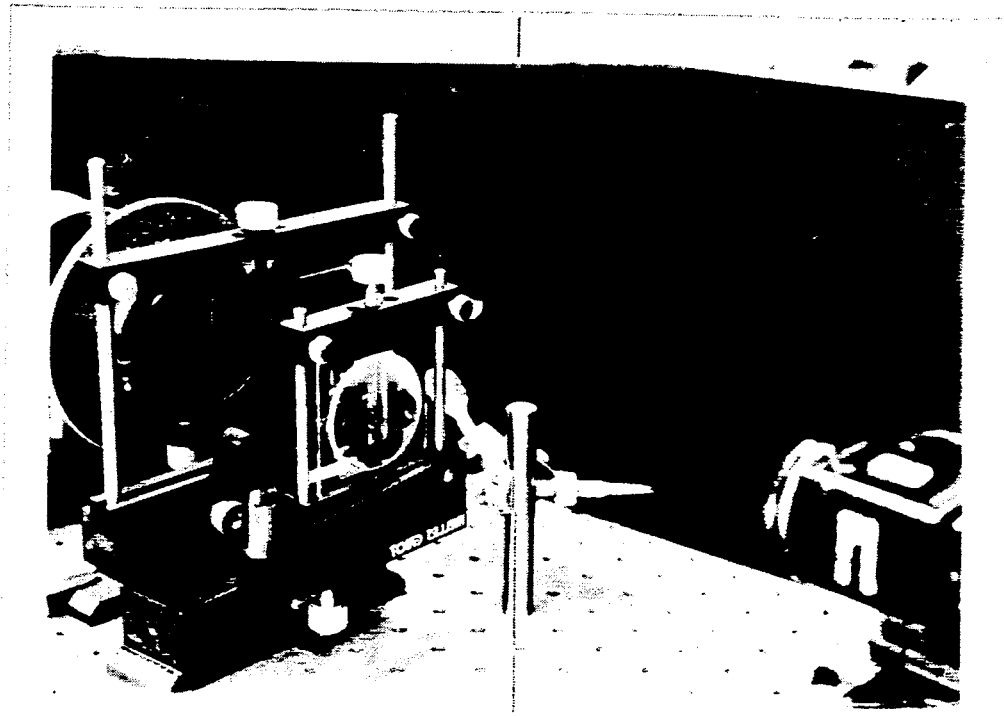
FIG. 18 is a plate representing a photograph of an experimental setup for validation and measurement of the motionless optical readout head in accordance with the present invention, the experimental setup including from right to left an Ar+laser producing collimated laser light, a slit aperture, and e-beam plate simulating an optical disk, the preferred Hybrid refractive/diffractive Optical Lens (HOL), and a CCD camera.
Figure 19A:
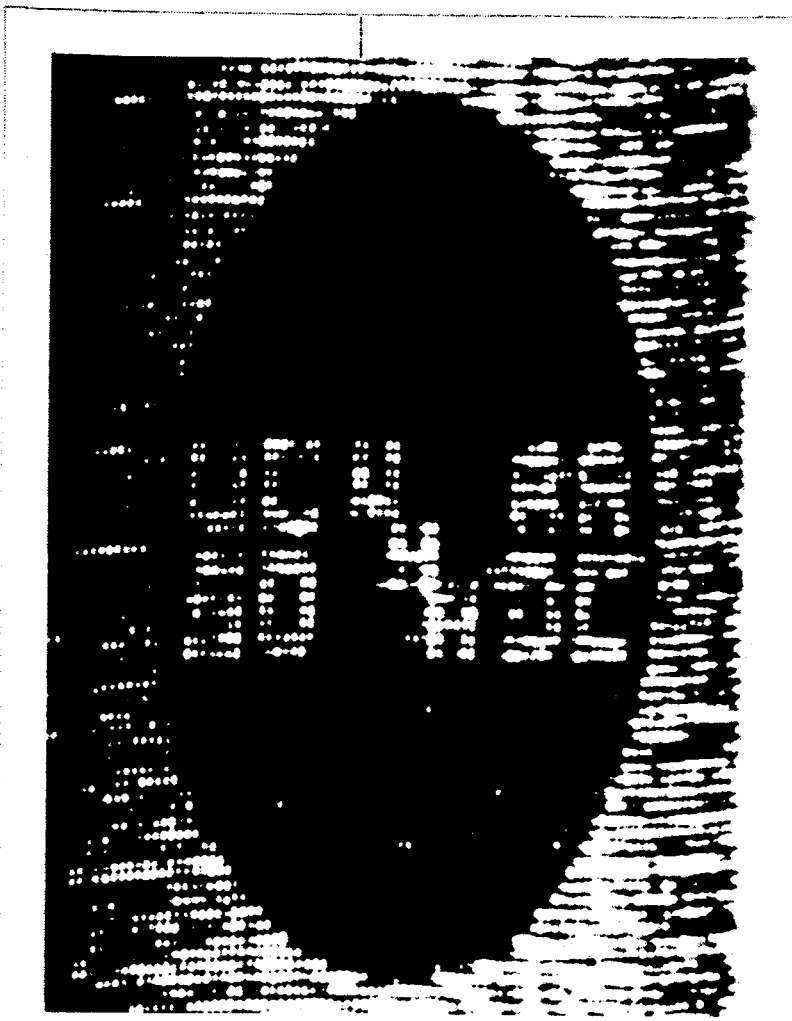
FIG. 19, consisting of FIG. 19a and FIG. 19b, are plates representing images produced by the CCD camera shown in FIG. 18 which images respectively represent (i) and output image derived with an all refractive optical readout head, and (ii) and image derived by use of the preferred Hybrid refractive/diffractive Optical Lens (HOL) optical readout head, of the present invention.
Figure 19B:
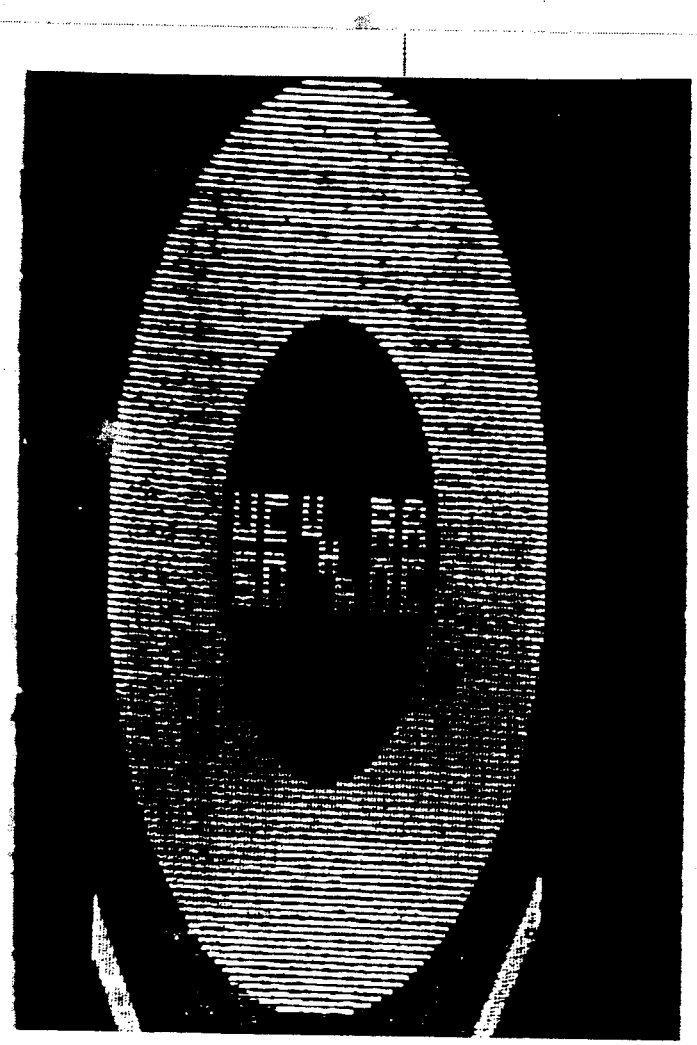

FIG. 18 shows the setup of an optical bench used to test the Hybrid Optical Lens (HOL). The alignment of the lens to the hologram plate was much simpler and took less time than the alignment of the refractive cylindrical lenses in the alternative optical system. FIG. 19, consisting of FIG. 19a and FIG. 19b, compares the output of the system using the original refractive cylindrical lens system shown in FIG. 19a to the output obtained using the new Hybrid refractive/diffractive Optical Lens shown in FIG. 19b. As can be seen, the new Hybrid Optical Lens (HOL) performs well. In particular, the spherical aberrations present in the refractive system have been almost totally eliminated so that the 1-D reconstructions are much better aligned vertically in the output plane. Also, the uniformity of both intensity and focus spot size is much improved using the Hybrid Optical Lens.

1.5.7 Recapitulation, and Conclusions

A hybrid optical lens (HOL) is superior to either combination of cylindrical lenses. Two separate designs using Orthogonal Cylindrical Diffractive Lenses (OCDL) were studied, both designs overcoming the problem associated with refractive cylindrical lenses. Another design studied was a single element HOL with both focal lengths positive but different. Still another design studied was a Hybrid refractive/diffractive Optical Lens (HOL) that combines an Optical Element (OE) with a plano-convex spherical lens. In this case one focal length is positive while the other is negative.

The respective optical performance of three different systems is shown in Table 2 of FIG. 12: 1) two orthogonal cylindrical diffractive lenses, 2) two orthogonal cylindrical diffractive lenses, and 3) a Hybrid refractive/diffractive Optical Lens (HOL). The error functions were calculated with the CODE V optical design software program, and correspond to the distance of all the rays to the chief ray in the output plane. The results show that the best system is the Hybrid Optical Lens (HOL) on the basis of both optical performance and fabrication requirements.

A ray-tracing analysis of (i) the orthogonal cylindrical refractive lenses (shown in FIG. 3, and originally discussed in conjunction therewith), (ii) the orthogonal cylindrical diffractive lenses (introduced in FIG. 11a, and compared in Table 2 of FIG. 12), and (iii) the Hybrid refractive/diffractive Optical Lens (the HOL, compared in Table 2 of FIG. 12) are respectively shown in FIGS. 13-15.

The Hybrid Optical Lens (HOL) will be understood to be a (superior) replacement for the two Orthogonal Cylindrical Diffractive Lenses (OCDL). Indeed, the HOL raises the required f/# of the OCDL, which in turn reduces the size of its features in replication of the performance of the OCDL. Thus a larger size OCDL with more phase levels and a higher diffraction efficiency can be fabricated more easily, and at a smaller size, as a HOL.

As an illustration of the design of the HOL, a first mask of its first diffractive element was seen in FIG. 16. A plate corresponding to a photomicrograph (100×magnification) of the central portion of an HOL, showing its simultaneous realization of the functions of both OCDL, was shown in FIG. 17. A photograph of a test of the HOL on an optical bench was shown in FIG. 18. From right to left FIG. 18 shows a laser source of collimated light (Ar+), a slit aperture, an e-beam patterned plate (simulating an optical disk), the Hybrid refractive/diffractive Optical Lens (the HOL), and a CCD camera for recording reconstituted 2-D images.

In summary, the refractive system in the parallel readout optical disk system was first analyzed. A new Hybrid refractive/diffractive Optical Lens (HOL) was designed using the CODE V optical design software. An orthogonal cylindrical diffractive lens was used to realize the diffractive portion of the hybrid lens due to the fact that $f_x$ and $f_y$ were different in both magnitude and sign. The performance, as measured by the CODE V optical design software running in a computer, improved by a factor of over 100. Besides aberration correction, the number of individual elements was reduced, which significantly simplified the alignment process. Experimental results show marked improvement in output uniformity and distortion over the alternative refractive optical system.

2. Application of the Optical Disk Readout System of the Present Invention to An Associative Memory

2.1 Associative Memory System Overview

An associative memory system implemented by use of the parallel readout optical disk in accordance with the present detail in the companion patent application U.S. Ser. No. 785,408 filed on an even date herewith for an OPTOELECTRONIC ASSOCIATIVE MEMORY USING PARALLEL-READOUT OPTICAL DISK STORAGE to inventors Ashok V. Krishnamoorthy, Philippe J. Marchand, Gokce Yayla and Sadik C. Esener. The contents of the related patent application are incorporated herein by reference.

Figure 21:
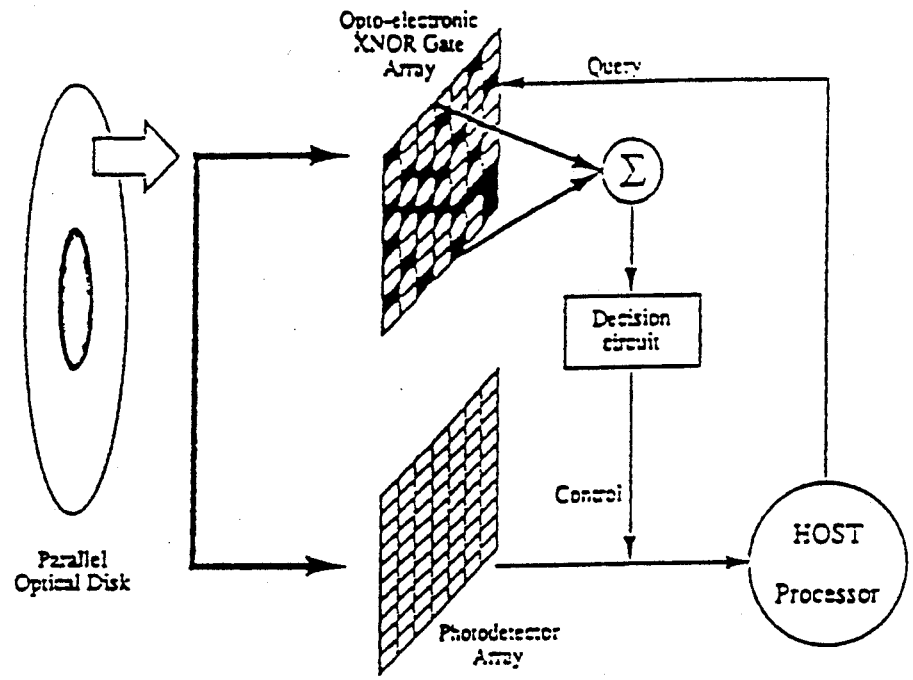
FIG. 21 is a block diagram of the design of an Associative memory using the motionless parallel readout head for an optical disk recorded with arrayed one-dimensional holograms in accordance with the present invention.

The associative memory system diagrammatically shown in FIG. 21 includes, as well as the parallel readout optical disk in accordance with the present invention, an opto-electronic XNOR gate array, a photodetector array and a single variable threshold summation circuit. In one of its embodiments (further embodiments being discussed in the companion patent application), a 2-D query from the host computer is electronically loaded onto the XNOR gate array. The query image is then compared serially to the binary images from the optical disk (bitwise matching operations). The output of the variable threshold detector is then fed into the decision circuit which controls the data flow between the photo-detector array and the host computer.

Figure 22:
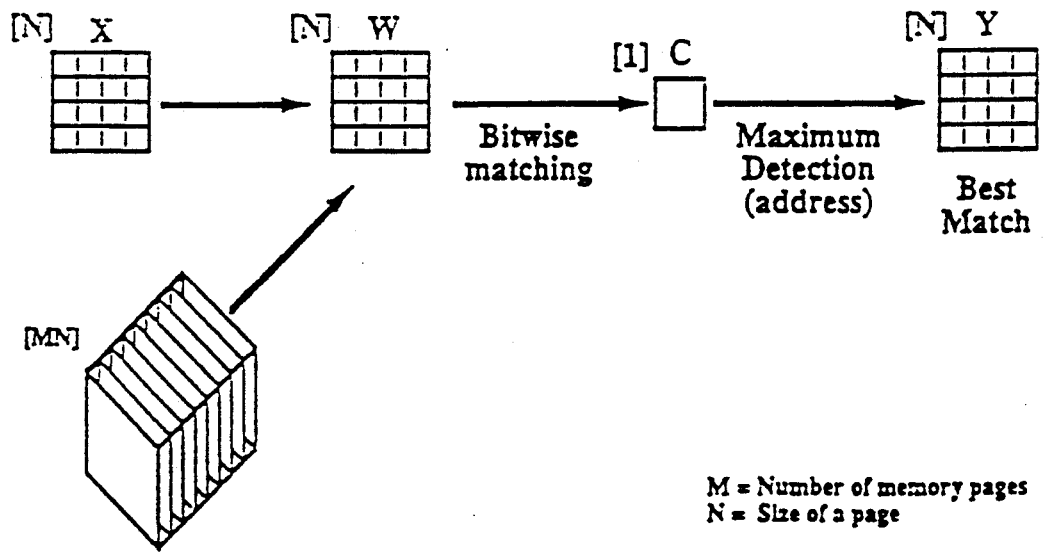
FIG. 22 is a diagrammatic representation of the performance in of a serial inner-product algorithm for image matching in an Associative memory.

This associative memory system using the optical disk is well suited to implement a page serial, bit parallel inner product algorithm which is diagrammatically shown in FIG. 22. The search time of this method is higher than those of outer product and parallel inner product methods. Reference P. Marchand, A. Krishnamoorthy, P. Ambs, and S. Esener, "Opto-electronic associative recall using motionless-head parallel readout optical disk", SPIE Proceedings 1347, San Diego, 1990 (published January, 1991). However, due to the high data rate achievable with the parallel readout optical disk, the page serial, the bit parallel inner product method is still capable of low retrieval times.

The optical disk readout system of the present invention can support three modes of operation for the Associative memory.

In the first mode, the threshold value is preselected. Local logical Exclusive NOR (XNOR) operations are performed between the bits of the electronic query and the corresponding bits of the disk image. Therefore only images that are close to the query will be retrieved by the host computer via the photodetector array.

The second mode finds the best match to the query image. On the first rotation, the Hamming distance for each image is input to the decision circuit in the manner described above. The best match is identified and retrieved on the subsequent rotation.

The third mode contemplates use of the system as a classifier in pattern recognition applications. A query image, or sub-image, is compared to all images stored on a disk. If a match within a certain Hamming distance is found then the query is assumed to belong to that particular class or classes.

A key element of the associative memory system using the motionless head disk is the optoelectronic XNOR integrated circuit which is computing the inner product. Two different approaches have been considered to realize this circuit, one analog approach and a digital approach.

2.2 Analog Approach to Realizing an Associative Memory Decision Circuit

A schematic view of an Associative memory including a decision circuit is shown in FIG. 23, consisting of FIG. 23a and FIG. 23b. Within the decision circuit an XNOR gate array is coupled to an optically and electronically addressed 2-D PLZT SLM: reference T. H. Lin, A. Ersen, J. H. Wang, S. Dasgupta, S. C. Esener, S. H. Lee, "Two-dimensional spatial light modulators fabricated in Si/PLZT," Appl. Opt. 29, pp 1595–1603, April, 1990. The gate array is simply silicon circuitry that performs the Exclusive-NOR function.

Each unit cell receives three inputs as well as control information. The query bit is electronically loaded from the host computer. The corresponding bit from the stored images arrive from the disk at the detector. The third input is a clock obtained from the disk that signals when a complete image is under observation. The detector circuits of the XNOR gate array are designed to provide large noise margins for the detected input bits. The SNRs achievable with the disk holograms can therefore be tolerated since each detector circuit restores logic levels. The logic circuitry drives the PLZT modulator so as to allow light to pass when a bit match occurs. Therefore, the output light represents a logical Exclusive-nor operation of the query bits and the corresponding bits of the stored image. There are two limitation to this approach. The minimal Hamming distance which can be distinguished is limited by the contrast ratio of the Si/PLZT modulators and by the dynamic range of the variable threshold detector.

2.3 Digital Approach to Realizing an Optoelectronic Integrated Circuit

The limitations of the previously described analog approach can be overcome by replacing the Si/PLZT XNOR gate array with an Opto-Electronic Integrated Circuit (OEIC) based on a tree structure. The concept of optoelectronic integrated circuits is discussed by G. Marsden et al. in "Dual-scale topology optoelectronic processor," OSA annual meeting '90 Boston, paper TUJJ2, November, 1990; and also by A. Krishnamoorthy et al., "Optoelectronic associative memory using a parallel readout optical disk," OSA annual meeting ,90, Boston, paper MJ5, November, 1990.

The OEIC has light detectors to receive the light from the images read from the disk. It also has local silicon circuitry to perform the XNOR operation between the disk images bits and the query bits and fan-in units to perform the sums of the bits down the tree. A schematic view of such an OEIC, based on a H-tree structure is shown in FIG. 23b. A H-tree structure is described by the aforementioned A. Krishnamoorthy et al.

Using this OEIC system, the Hamming distance between a query and the image stored on the disk can be measured with a precision of one bit. Furthermore, the system maintains high throughput, since all operations down the tree can be pipelined due to the H-tree structure where all electronic lines have equal length and introduce no signal skew.

Figure 24A:
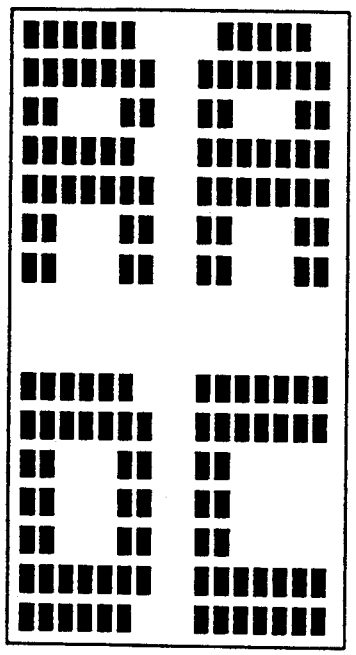
FIG. 24, consisting of FIGS. 24a through 24c, is a sequence of diagrammatic representations of (i) an arbitrary input query having the arrayed letters "RADC"; (ii) a pixel-bit by pixel-bit output of the XNOR gates shown in FIGS. 21 and 23, which output shows a complete match with one image of the memory, and (iii) the image recovered from the memory, namely the optical disk recorded with arrayed one-dimensional holograms that is read by the motionless readout head in accordance with the present invention.
Figure 24B:
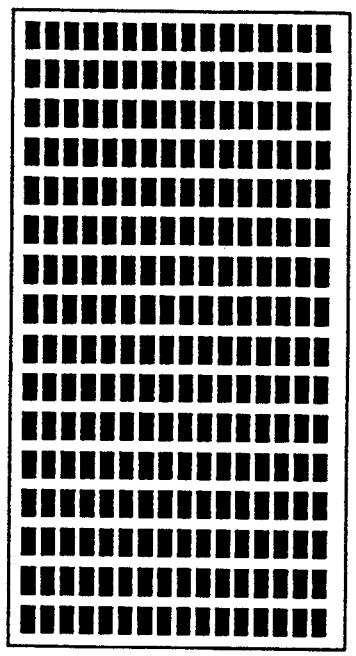
Figure 24C:
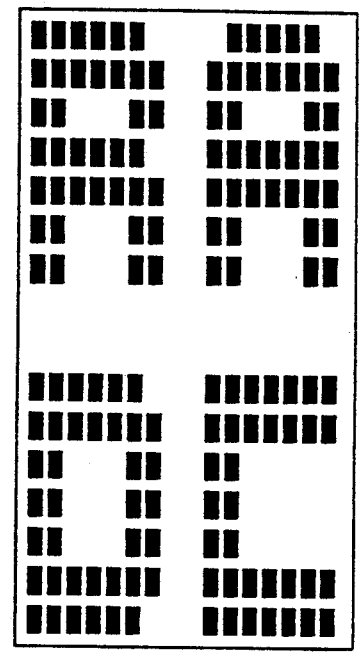

A simulation of this system has been implemented. The images are read from the disk using a CCD camera interface to a PC computer. Once an image is read, it is digitized and compared (XNOR operations) to the electronic query. The results of the XNOR operations are then summed and the Hamming distance between the query and the disk images is calculated. The results of the simulation can be seen FIG. 24, consisting of FIG. 24a through FIG. 24c, where 16×16 images were used.

3. Summary

This specification has described a motionless-head 2-D parallel readout system for optical disks. The system requires no mechanical motion of the head for access, focusing, tracking, or addressing. Addressing, in particular, is performed only through the rotation of the disk.

A higher data rate than any existing optical disk system can be achieved since the entire memory can be scanned in one rotation. The data is written on the disk as 1-D Computer-Generated Hologram (CGH). A special CGH encoding method using an iterative algorithm and a grey level representation by density modulation has been shown to give superior, high-quality, image reconstructions.

The optical readout system is very simple and consists of only three or fewer cylindrical lenses (or equivalents thereto). For easier system alignment and better optical performance, two of these lenses can, in particular, be beneficially replaced by a single hybrid diffractive/refractive optical element.

The one-dimensional holograms that are read in parallel by the motionless readout head of the present invention may be recorded one binary bit at a time, one hologram at a time, one array of holograms at a single time, or even so many arrays of holograms as occupy an entire optical media (typically the surface of an optical disk) at one time. There are two reasons why master holograms may acceptably be recorded in minutiae, and not in gross. First, the computational time necessary to transform digital data into a one dimensional hologram may be as long as, or longer than, even the slower means of recording such holograms. It is therefore no great penalty to the write throughput of an optical system based on holograms that the holograms should be written relatively slowly. Second, the data contained within the holograms, and the optical media, is typically read many more times than it is written. Indeed, some optical media—and the present invention is applicable to all types of optical media howsoever, or howsoever slowly, written—is called "Write Once, Read Many". It is therefore no great penalty to the overall throughput of an optical memory system that the write should be relatively slower, or much slower, than the read. It is indeed well that it is acceptable to write optical media relatively slowly because, circa 1991, most proven systems for writing optical media so perform relatively slowly.

The present invention requires no link between the scale, and rate, at which information is written on (or in) optical media and the scale, and rate, at which such information is retrieved. Although it is certainly acceptable to the readout of arrayed holograms in accordance with the present invention that such holograms should have been written quickly and/or in parallel, it is not offensive to the readout of the present invention that such holograms should be written relatively slowly, and/or at low granularity including binary bit by binary bit.

Therefore, at the onset, the present invention teaches that it is possible to read in parallel, and at a relatively large scale and relatively high speed, information that has been recorded in the form of holograms at a relatively much lower scale and speed, including serially one binary bit at a time.

Figure 20A:
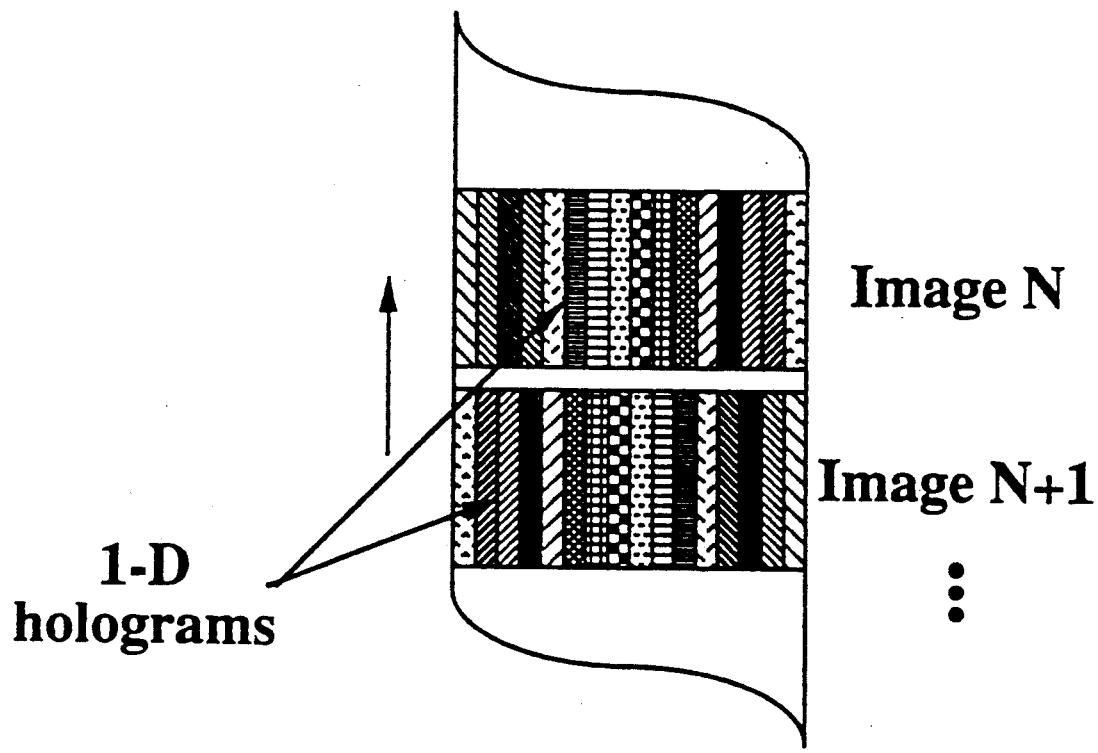
FIG. 20, consisting of FIG. 20a and FIG. 20b, is a diagrammatic representation of the application of the principles of the present invention to the organization of 1-D holograms in two different formats on optical tape, each of which formats may be read by a motionless readout head in accordance with the present invention.
Figure 20B:
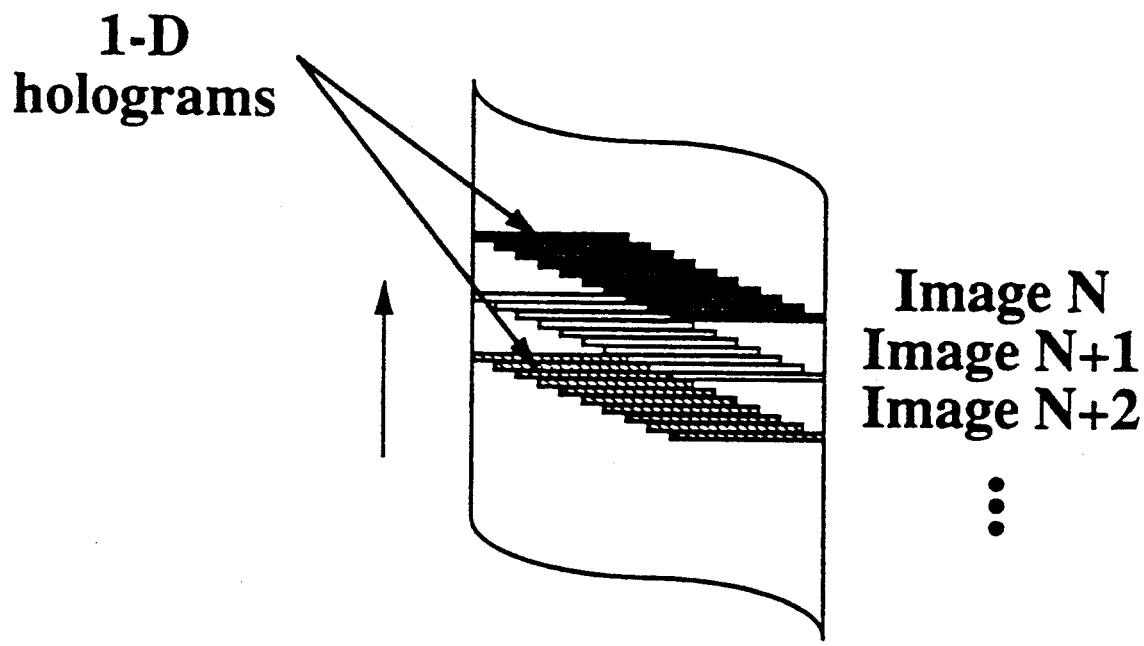

It is not necessary that the one-dimensional holograms should be recorded upon, nor read from, an optical disk. The 1-D holograms may, for example, be recorded upon optical tape. Two different manners of organizing, or placing, the holograms on optical tape are shown in FIGS. 20a and 20b. The holograms are read along a focal line that passes through successive groups of arrayed holograms, where each group of 1-D holograms contains a number of individual holograms, as the optical tape moves. The organization, and array, of FIG. 20b is preferred because the successive groups, or arrays, of holograms are closer together, and pass under the read head, relatively more quickly then when organized as shown in FIG. 20a. It should be understood that the apparent wasted recording area shown in FIG. 20b is a function of the scale of the illustration only, and that the successive arrays of holograms are really fairly tightly packed similarly to the disk surface shown in FIG. 2.

An optical tape may have a long seek time for any individual hologram, but is obviously capable of storing, in accordance with the resolution of the media of the tape and the scale of the patterning of this media with 1-D holographically-encoded information, stupendous amounts of information. Because the read head need only be relatively crudely, and absolutely permanently, focused to the optical tape, it is possible to "fly" the optical tape past the read head at high speed, and image data may be retrieved form the optical tape at high bandwidths which typically only start in the gigabit per second range, and which can theoretically be pushed much higher.

The optically decoded data derived by the present invention is, as detected by light detectors that may typically exhibit picosecond response times and as converted into electrical signals, typically ultimately input into silicon-based circuitry. As the optical storage is improved to transfer data faster and faster, there is a very real possibility that the data transfer bandwidth of the optical storage will outstrip the capacity of silicon-based circuitry to accept such data. Notably in the present invention, and regardless whether the optical media is tape or disk, the optical storage delivers its information in electrical parallel. This simple statement is only indirectly resultant from the parallel readout of the arrayed one-dimensional holograms; it is more directly a consequence of the detection of the spatially encoded wavefront of the light beam by an array of light detectors, each of which produces an electrical signal in parallel. If information is decoded from its optically-encoded form too quickly for one single silicon-based circuit to accept, then it is possible to connect a number of silicon circuits to each of the light detectors in parallel.

Another approach to accepting the electrical signals resultant from the optically-decoded information at greater informational transfer bandwidths is to preprocess the electrically-encoded information close by, and typically upon the same chip substrate, where such electrically-encoded information is derived (from optically-encoded information, by arrayed light detectors). The present and related inventions teach such "preprocessing" particularly for the logical, Exclusive NOR, function. It is obvious that other electrically-performed logical and arithmetic functions, such as addition, could be implemented on the same chip(s) as convert the light-encoded information into the electrically-encoded information.

An opto-electronic associative memory system using the parallel readout optical disk has been discussed. This associative memory system consists of the parallel readout optical disk, a host computer, an optoelectronic XNOR gate array and its summation circuit (analog or digital) and a local decision circuit. The throughput (1.1 Gbytes/sec) and retrieval times (25 ms) of this associative memory system make it well suited to current, and near-term future, needs for high performance associative recall.

In accordance with the preceding discussion and accompanying remarks, the present invention should be conceived broadly, and in accordance with the following claims only, and not solely in terms of those particular embodiments within which the invention has been taught.

What is claimed is:

1. A parallel readout optical disk system comprising:
   an optical disk having an active surface encoded with a multiplicity of data blocks each of which is in the form of a mathematically one-dimensional hologram, each plurality of data blocks that in combination represent one word being positionally distributed, and positionally shifted one to the next, radially along the disk's active surface to fit a complete radius;
   means for simultaneously illuminating the encoded optical disk along a radius within which the plurality of holographic data blocks constituting one word are fitted;
   optical transform means responsive to the illuminated plurality of holographic data blocks for transforming the combined holographic images into a light beam upon which the word is encoded in parallel.

2. The parallel readout optical disk system according to claim 1 wherein the optical disk is encoded with mathematically one-dimensional Fourier transform holograms.

3. The parallel readout optical disk system according to claim 1 wherein the optical disk is encoded with mathematically one-dimensional Fourier transform holograms algorithmically iteratively generated by adaptation of the Direct Binary Search (DBS) algorithm to a gray level encoded representation of the data word.

4. The parallel readout optical disk system according to claim 1 wherein the means for illuminating comprises:
   a collimated light source; and
   a cylindrical lens.

5. The parallel readout optical disk system according to claim 4 wherein the collimated light source comprises:
   a light source; and
   a collimating lens.

6. The parallel readout optical disk system according to claim 1 wherein the optical transform means comprises:
   a lens system.

7. The parallel readout optical disk system according to claim 6 wherein the optical transform lens system comprises:
   a first refractive cylindrical lens performing a Fourier transform of the mathematically one-dimensional holograms along the radial direction; and
   a second refractive cylindrical lens for imaging the transformed holograms along a direction orthogonal to the disk's active surface.

8. The parallel readout optical disk system according to claim 6 wherein the optical transform lens system comprises:
   a first diffractive cylindrical lens performing a Fourier transform of the mathematically one-dimensional holograms along the radial direction; and
   a second diffractive cylindrical lens for imaging the transformed holograms along a direction orthogonal to the disk's active surface.

9. The parallel readout optical disk system according to claim 6 wherein the optical transform lens system comprises:
   a Fourier-transforming and imaging hybrid refractive/diffractive optical lens.

10. The parallel readout optical disk system according to claim 9 wherein the Fourier-transforming and imaging hybrid refractive/diffractive lens comprises:
    a spherical diffractive lens; and
    a cylindrical diffractive lens.

11. A parallel readout optical memory comprising:
    a media optically encoded with an arrayed multiplicity of data blocks,
       each of the data blocks constituting a mathematically one-dimensional hologram,
       a linearly-arrayed plurality of data blocks representing, in combination, one encoded word,
       a number of linearly-arrayed data blocks being positionally distributed along a path, one linearly-arrayed plurality of data blocks to the next;
    illuminating means for simultaneously illuminating one entire linearly-arrayed plurality of data blocks encoded in the media, the illuminated plurality of data blocks constituting one encoded word;
    means for moving the media relative to the illuminating means along the path so that successive linearly-arrayed pluralities of data blocks are successively illuminated;
    optical transform means response to the illuminating of each successive one of the linearly-arrayed pluralities of data blocks for transforming in parallel, as each such linearly-arrayed plurality of data blocks is successively illuminated, the mathematically one-dimensional holograms that constitute each such illuminated plurality of data blocks into a light beam upon which a word is encoded in parallel.

12. A parallel readout optical memory comprising:
    a media optically encoded with a two-dimensionally arrayed multiplicity of holograms,
       each of which holograms represents a set of data,
       a plurality of holograms being linearly arrayed in a first direction of the media, this linearly-arrayed plurality representing plural sets of data which plural sets collectively constitute a universal set of data,
       a number of linearly-arrayed pluralities of holograms being positionally distributed along a path, one linearly-arrayed plurality of holograms to the next;
    illuminating means for simultaneously illuminating one entire linearly-arrayed plurality of holograms encoded in the media, the illuminated plurality of holograms collectively constituting the universal set of data;
    means for moving the media relative to the illuminating means along the path so that successive linearly-arrayed pluralities of holograms are successively illuminated;
    optical transform means response to the illuminating of each successive one of the linearly-arrayed pluralities of holograms for transforming in parallel, as each such linearly-arrayed plurality of holograms is successively illuminated, all the holograms that are within each such illuminated plurality of holograms into a light beam upon which the set of data is encoded in parallel, and in two dimensions.

13. The parallel-readout optical memory according to claim 12 wherein the optical media comprises:
    an optical disk;
    and wherein the means for moving comprises:

rotational means for rotating the optical disk relative to the illuminating means.

14. The parallel-readout optical memory according to claim 12
   wherein the optical media is encoded on its surface, the number of linearly-arrayed pluralities of holograms being positionally distributed along a path that is upon the surface; and
   wherein the means for moving moves the media relative to the illuminating means along the surface path.

15. The parallel-readout optical memory according to claim 12
   wherein the optical media is optically encoded with a two-dimensionally arrayed multiplicity of holograms each of which holograms represents a mathematically one-dimensional strip of image data, the plurality of such holograms linearly arrayed in a first direction of the media representing plural mathematically one-dimensional strips of image data which plural strips collectively constitute a two-dimensional image;
   wherein the illuminating means is simultaneously illuminating one entire linearly-arrayed plurality of holograms encoded in the media, which illuminated plurality of holograms collectively constitute the two-dimensional image; and
   wherein the optical transform means is responsive to the illuminating of each successive one of the linearly-arrayed pluralities of holograms for transforming in parallel, as each such linearly-arrayed plurality of holograms is successively illuminated, all the holograms that are within each such illuminated plurality of holograms into a light beam upon which the two-dimensional image is encoded in parallel, and in two dimensions.

16. An optical medium recorded with a two-dimensionally arrayed multiplicity of mathematically one-dimensional holograms
   wherein each of the holograms encodes a set of data,
   wherein a first plurality of such mathematically one-dimensional holograms are linearly arrayed substantially along a first axis of the optical medium, this first plurality of first-axis-arrayed holograms collectively encoding a first plurality of sets of data, which first plurality of data sets collectively constitute a universal data set,
   wherein second plurality of such linearly-arrayed first pluralities of holograms are distributed along another, second, axis of the medium which second axis intercepts the first axis;
   wherein the optical medium is recorded with a two-dimensionally arrayed multiplicity of mathematically one-dimensional holograms.

17. The optical medium according to claim 16
   wherein each of the holograms encodes a mathematically one-dimensional strip of image data,
   wherein the first plurality of such holograms that are linearly arrayed substantially along the first axis of the medium encode a first plurality of strips of image data, which first plurality of image data strips collectively encode the data of a two-dimensional image,
   wherein the second plurality of such linearly-arrayed first pluralities of holograms as are distributed along the second axis of the medium encode a second plurality of two-dimensional images.

18. The optical medium according to claim 16 wherein the holograms are digitally encoded;
   and wherein the optical medium further comprises:
      surface features detectable as binary bits by which features the digitally-encoded holograms are recorded.

19. The optical medium recorded with a two-dimensionally arrayed multiplicity of mathematically one-dimensional holograms according to claim 16
   wherein the first plurality of holograms are linearly arrayed substantially along a radius of an optical disk; and
   wherein the second plurality of such radially-linearly-arrayed first pluralities of holograms are distributed in an annulus circumferentially around the optical disk.

20. The optical medium recorded with a two-dimensionally arrayed multiplicity of mathematically one-dimensional holograms according to claim 16
   wherein the first plurality of holograms are linearly arrayed substantially transversely to a longitudinal axis of an optical tape; and
   wherein the second plurality of such axially-transversely-linearly-arrayed first pluralities of holograms are distributed along the longitudinal axis of the optical tape;
   wherein the optical tape is recorded with a two-dimensionally arrayed multiplicity of mathematically one-dimensional holograms.

21. The optical tape recorded with a two-dimensionally arrayed multiplicity of mathematically one-dimensional holograms according to claim 20
   wherein each of the mathematically one-dimensional holograms is elongate in its one dimension along a hologram axis:
   wherein the hologram axis of each of the first plurality of holograms is substantially parallel to the longitudinal axis of the optical tape.

22. The optical tape recorded with a two-dimensionally arrayed multiplicity of mathematically one-dimensional holograms according to claim 20
   wherein each of the mathematically one-dimensional holograms is elongate in its one dimension along a hologram axis:
   wherein the hologram axis of each of the plurality of holograms is substantially perpendicular to the longitudinal axis of the optical tape.

23. A method for parallel readout of an optical medium, the method comprising:
   encoding an optical medium with a multiplicity of mathematically one-dimensional holograms so that the holograms line along a single line,
      each of the multiplicity of holograms is a transformed slice of a single two-dimensional image, and
      the complete multiplicity of the holograms are in aggregate a sliced transformation of the entire two-dimensional image;
   illuminating the multiplicity of holograms simultaneously, and along the line;
   optically transforming the simultaneously-illuminated multiplicity of mathematically one-dimensional holograms in order to reconstitute, as a parallel encoding of a wavefront of a light beam, a replica of the two-dimensional image.

24. The optical medium parallel readout method according to claim 23 wherein the encoding comprises:

generating in a computer a multiplicity of mathematically one-dimensional Fourier transform holograms; and impressing the multiplicity of computer-generated mathematically one-dimensional Fourier-transform holograms upon the optical medium.

25. The optical medium parallel readout method according to claim 23 wherein the encoding comprises:

generating in a computer a multiplicity of mathematically one-dimensional non-Fourier transform holograms by an iterative algorithm; and impressing the multiplicity of computer-generated mathematically one-dimensional non-Fourier-transform holograms upon the optical medium.

26. The optical medium parallel readout method according to the claim 23 wherein the encoding comprises:

embedding a first multiplicity of pixels of a single image slice within an array of a second multiplicity of elements;

transforming by a mathematical transform the arrayed second multiplicity of elements to produce a multiplicity of sample values;

quantizing on a grey scale the multiplicity of sample values each into (n+1) grey levels contained with an n-bit pattern;

replicating the multiplicity of n-bit patterns to produce a mathematically one-dimensional hologram having a dimension of 2 multiplicities of elements by n-bits each element; and impressing the multiplicity of computer-generated mathematically one-dimensional Fourier-transform holograms upon the optical medium.

27. The optical medium parallel readout method according to claim 26 wherein the embedding is of 128 pixels of a single image slice within an array of 512 elements;

wherein the transforming by mathematical transform is of the 512 elements to produce 512 sample values;

wherein the quantizing is of 512 sample values each into 5 grey levels contained with a 4-bit pattern; and wherein the replicating is of the 512 4-bit patterns to produce a mathematically one-dimensional hologram having a dimension of 1024 elements by 4-bits each element.

28. The optical medium parallel readout method according to claim 23 applied to produce an optical disk having an active surface encoded with a multiplicity of mathematically one-dimensional non-Fourier transform computer-generated holograms.

29. The optical medium parallel readout method according to claim 26 wherein the transforming comprises:

Fourier transforming in a computer.

30. The optical medium parallel readout method according to claim 29 wherein the encoding comprises:

Fourier transforming in a computer by execution of an iterative algorithm.

31. The optical medium parallel readout method according to claim 23 applied to an optical disk, wherein the encoding comprises:

impressing an optical disk with the multiplicity of mathematically one-dimensional holograms along a straight line.

32. The optical disk parallel readout method according to claim 31 wherein the impressing of the optical disk with the multiplicity of mathematically one-dimensional holograms is along a straight line that is substantially radial.

33. The optical disk parallel readout method according to claim 32 wherein the impressing of the active medium of the optical disk is with the multiplicity of mathematically one-dimensional holograms located substantially contiguously along the straight line.

34. The optical disk medium parallel readout method according to claim 23 wherein the illuminating comprises:

illuminating with collimated laser light.

35. The optical medium parallel readout method according to claim 23 wherein the optically transforming comprises:

Fourier-transforming in a first refractive cylindrical lens the simultaneously-illuminated multiplicity of mathematically one-dimensional holograms in order to reconstitute a two-dimensional image; and imaging in a second refractive cylindrical lens the reconstituted two-dimensional image into the replica of the two-dimensional image.

36. The optical medium parallel readout method according to claim 23 wherein the optically transforming comprises:

Fourier-transforming in a first diffractive cylindrical lens the simultaneously-illuminated multiplicity of mathematically one-dimensional holograms in order to reconstitute a two-dimensional image; and imaging in a second diffractive cylindrical lens the reconstituted two-dimensional image into the replica of the two-dimensional image.

37. The optical medium parallel readout method according to claim 23 wherein the optically transforming comprises:

Fourier-transforming and imaging in a hybrid refractive diffractive lens the simultaneously-illuminated multiplicity of mathematically one-dimensional holograms in order to reconstitute the replica of the two-dimensional image.

38. A method for parallel readout of an optical medium that is encoded with a plurality of mathematically one-dimensional holograms so that the plurality of holograms lie along a single line, each of the plurality of holograms encodes one set of data, and the complete plurality of the holograms encode, in aggregate, a universal set of data, the method comprising:

simultaneously illuminating the plurality of holograms along the line; and optically transforming the simultaneously-illuminated plurality of holograms in order to reconstitute, as a parallel encoding of a wavefront of a light beam, the universal set of data.

39. The method for the parallel readout of an optical medium according to claim 38 wherein each of the plurality of holograms lying along the single line is a transformed slice of a single two-dimensional image;

wherein the complete multiplicity of the holograms are in aggregate a sliced transformation of the entire two-dimensional image; and wherein the optically transforming of the simultaneously-illuminated multiplicity of mathematically one-dimensional holograms is in order to reconstitute, as a parallel encoding of a wavefront of a light beam, a replica of the two-dimensional image.

40. A method of encoding holographic information representing a two-dimensional pixel image upon an optical disk, the method comprising:
dividing the pixel image into A mathematically one-dimensional slices of B pixel bits each;
embedding, with a specific shift related to its order within the image, each mathematically one-dimensional slice of B pixels into a mathematically one-dimensional array of C elements all of which are initially zero;
multiplying each array of C elements by a random phase;
transforming by a mathematically transform each array of C phase-multiplied elements to produce an array of C sample values, extracting a real part of each mathematically transformed array and adding a bias equal to its minimum as proves necessary in order to make all C sample values to be real positive numbers;
quantizing on a grey scale of D+1 levels the C sample values each into C patterns of D bits each by application of a mathematical density modulation algorithm;
replicating the C patterns of D bits each to produce a data block of 2×C cells of D bits each, this data block being a mathematically one-dimensional hologram; and
recording each data block in a successive position, circumferentially positionally shifted one to the next, radially along the disk's active surface until A data blocks fit radially within an annulus of the optical disk.

41. The method of encoding holographic information representing a two-dimensional pixel image upon an optical disk according to claim 40 wherein the transforming comprises:
Fourier transforming.

42. The method of encoding holographic information representing a two-dimensional pixel image upon an optical disk according to claim 40 wherein the Fourier transforming comprises:
Fourier transforming with a Fast Fourier Transform (FFT).

43. The method of encoding holographic information representing a two-dimensional pixel image upon an optical disk according to claim 40 wherein the Fourier transforming comprises:
Fourier transforming by an iterative execution of the Direct Binary Search (DBS) algorithm as adapted to the grey level quantizing.

44. The method of encoding holographic information representing a two-dimensional pixel image upon an optical disk according to claim 40
wherein the dividing of the pixel image is into 128 mathematically one-dimensional slices of 128 pixel bits each;
wherein the embedding, with a specific shift related to its order within the image, is of 128 mathematically one-dimensional slices of 128 pixels each into a mathematically one-dimensional array of 512 elements all of which are initially zero;
wherein the multiplying is of each array of 512 elements by a random phase;
wherein the transforming by a mathematical transform is of each array of 512 phase-multiplied elements to produce an array of 512 sample values;
wherein the quantizing of the 512 sample values is on a grey scale of 5 levels to produce 512 patterns of 4 bits each;
wherein the replicating of the 512 patterns of 4 bits each produces a data block having 1024 cells of 4 bits each; and
wherein the recording of each data block in a successive position, circumferentially positionally shifted one to the next, radially along the disk's active surface is until 128 data blocks fit a complete radius of the optical disk.

45. In a motionless-head parallel-readout optical system, a readout lens system for concurrently (i) Fourier-transforming a multiplicity of mathematically one-dimensional holograms aligned along a Y-axis and representing mathematically one-dimensional slices of a two-dimensional image, and (ii) imaging along an X-axis the mathematically one-dimensional holograms so Fourier-transformed in order to reconstitute the two-dimensional image, the readout lens system comprising:
a first lens for performing a Fourier transform of the mathematically one-dimensional holograms aligned along the Y-axis direction; and
a second lens for imaging the transformed holograms along an X-axis direction orthogonal to the Y-axis direction.

46. The readout lens system according to claim 45 wherein the first lens comprises:
a first refractive cylindrical lens having a first positive focal length; and wherein the second lens comprises:
a second refractive cylindrical lens having a second positive focal length different from the first focal length.

47. The readout lens system according to claim 45 wherein the first lens comprises:
a first diffractive cylindrical lens having a first positive focal length; and wherein the second lens comprises:
a second diffractive cylindrical lens having a second positive focal length different from the first focal length.

48. In a motionless-head parallel-readout optical system, a readout lens system for simultaneously (i) Fourier-transforming a multiplicity of mathematically one-dimensional holograms aligned along a Y-axis and representing mathematically one-dimensional slices of a two-dimensional image, and (ii) imaging along an X-axis the mathematically one-dimensional holograms so Fourier-transformed in order to reconstitute the two-dimensional image, the readout lens system comprising:
an orthogonal cylindrical diffractive optical lens for Fourier-transforming and imaging the mathematically one-dimensional holograms.

49. The readout lens system according to claim 48 wherein the readout lens system further comprises:
a refractive lens.

50. The hybrid lens according to claim 49 wherein the refractive lens comprises:
a plano-convex spherical refractive lens.

* * * * *